(12) United States Patent
Walker

(10) Patent No.: US 7,325,389 B2
(45) Date of Patent: Feb. 5, 2008

(54) HIGH-CLEARANCE DUMP SYSTEM WITH INDEPENDENT TILT CONTROL

(75) Inventor: Dean M. Walker, Fort Collins, CO (US)

(73) Assignee: Walker Manufacturing Company, Fort Collins, CO (US)

( * ) Notice: Subject to any disclaimer, the term of this patent is extended or adjusted under 35 U.S.C. 154(b) by 469 days.

(21) Appl. No.: 11/051,252

(22) Filed: Feb. 4, 2005

(65) Prior Publication Data

US 2006/0177292 A1 Aug. 10, 2006

(51) Int. Cl.
A01D 43/07 (2006.01)

(52) U.S. Cl. .................. 56/205; 56/202; 414/553; 414/422; 298/11

(58) Field of Classification Search ........ 414/303, 414/346–347, 420, 422, 471, 553; 298/11; 56/203, 205
See application file for complete search history.

(56) References Cited

U.S. PATENT DOCUMENTS

| | | | | |
|---|---|---|---|---|
| 3,631,998 | A * | 1/1972 | Fowell | 414/420 |
| 5,193,882 | A * | 3/1993 | Gamaldi | 298/11 |
| 6,371,565 | B1 * | 4/2002 | Libhart | 298/11 |
| 6,439,667 | B1 * | 8/2002 | Weets et al. | 298/11 |
| 6,449,933 | B1 * | 9/2002 | Umemoto et al. | 56/13.3 |
| 6,513,312 | B1 * | 2/2003 | Ishimori et al. | 56/203 |
| 6,584,757 | B2 * | 7/2003 | Komorida et al. | 56/202 |
| 6,672,043 | B2 * | 1/2004 | Shibata et al. | 56/202 |
| 6,688,091 | B2 * | 2/2004 | Ishimori | 56/202 |
| 6,840,029 | B2 * | 1/2005 | Ishimori | 56/202 |
| 6,931,827 | B2 * | 8/2005 | Komorida et al. | 56/202 |
| 7,047,718 | B2 * | 5/2006 | Caroni | 56/205 |

\* cited by examiner

Primary Examiner—Saul Rodriguez
Assistant Examiner—Charles Greenhut
(74) Attorney, Agent, or Firm—William W. Cochran; Cochran Freund & Young LLC

(57) ABSTRACT

A high-clearance dump system is described for use with a riding mower. A folding lift assembly lifts the catcher box up and away from the riding mower to allow dumping over and away from the walls of a truck or other receiving vehicle. The folding lift assembly interfolds into the dumping catcher assembly and the dump system mount assembly thus providing a low-profile when in the lowered position. A lift pivot arm, and lift control rods that are shorter than the lift pivot arm, cause the catcher frame to be tilted at an obtuse angle with respect to the lift pivot arm so that the back end of the catcher frame is higher than the front end of the catcher frame when the lift pivot arm is raised, thus providing high clearance. A power system provides power a switch box that switches power between a lift cylinder and a dump cylinder so that the catcher may be dumped in a raised, partially raised, or lowered position.

8 Claims, 19 Drawing Sheets

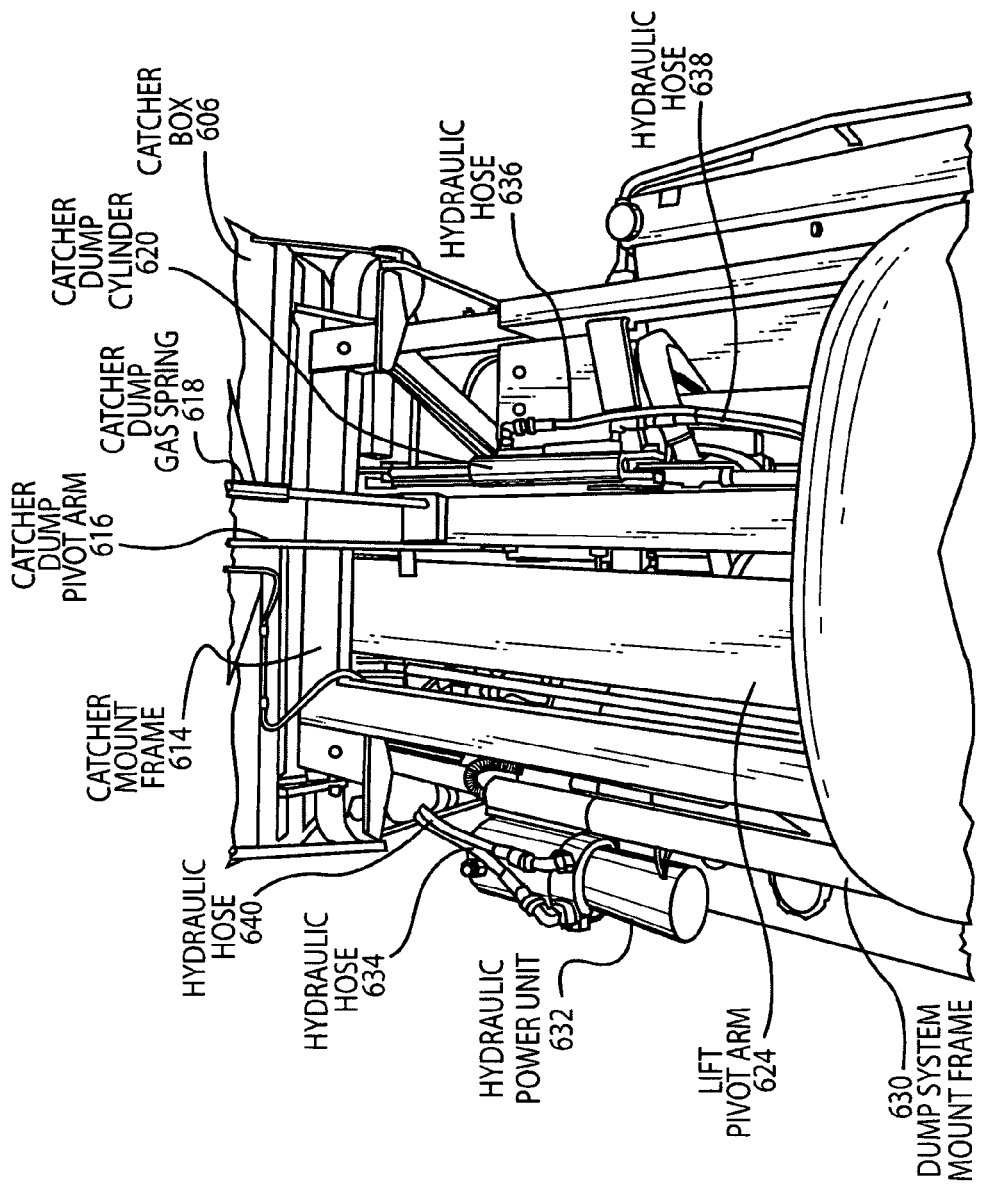

HIGH-CLEARANCE DUMP SYSTEM WITH INDEPENDENT TILT CONTROL

BACKGROUND OF THE INVENTION a. Field of the Invention

The present invention pertains generally to land vehicle mounted dump systems and in particular to elevating and tilting dump systems for riding mowers.

b. Description of the Background

Vehicle mounted dump systems are intended to provide a way for an operator to efficiently and easily dump containers that are filled with materials. For example, a simple manual dump system for a mower may comprise a grass catcher which the operator removes manually and dumps into a trailer or truck, which transports the clippings to a landfill or compost pile.

Commercial mowers may have automated dump systems that have larger containers and powered dump systems to dump larger loads. Some existing dump systems are designed to lift the catcher and then to tilt and dump the contents while the catcher is in an elevated position.

However, existing dump systems have disadvantages that limit their productive and efficient use. For example, existing dump systems raise the catcher box so that it is maintained in a position that is substantially horizontal or parallel to the frame of the vehicle on which it is mounted. In some existing dump systems, raising the catcher box in a parallel position limits the clearance height of the catcher box making it difficult or impossible to dump the contents of the catcher into a truck or pickup that has high walls. In other existing dump systems, the catcher box is raised high, but is positioned close to the mower which can cause uneven loading and spillage necessitating extra work on the part of the operator to redistribute the dumped contents or to clean up spillage.

A parallel raised position of the catcher box with respect to the mower frame is also less desirable when the front of the mower is higher that the back of the mower, for example if the mower is parked on an incline. The can cause the clearance of the dump system to be lower with respect to a receiving vehicle that is not on the same incline.

Another disadvantage of existing dump systems is that during the elevation of the catcher box, but prior to dumping, some clippings may spill from the catcher through the catcher box door. This is more of a problem in systems which elevate the catcher box while it is maintained in a substantially horizontal position or in a position in which the catcher box tilts toward the door opening prior dumping.

Commercial lawn mowers and similar vehicles require stability in order to be operated productively and safely. Existing dump systems diminish the stability of the vehicle to which they are attached because they are mounted in a way that significantly raises the center of gravity of the combined vehicle and dump system. Dump systems that raise the center of gravity more than 4 inches may negatively affect the stability and maneuverability of the vehicle. Dump systems that raise the height of the catcher box also make transportation and storage of the vehicle difficult because of greater clearance requirements. For example, if a mower with a dump system that raises the catcher box substantially is transported or stored on flatbed truck, lack of clearance may interfere with parking and passage of the truck.

Existing systems may combine the raising and dumping motion of the dump system such that the catcher box door opens or the catcher box begins to tilt in conjunction with the raising of the catcher box. Combined raising and tilting mechanisms may cause the contents to spill or to be dumped prematurely because there is no way to control the raising and tilting functions separately.

Existing systems may also have the disadvantage that the catcher box dumping action may only occur when the catcher box is fully raised thus preventing the operator from conveniently dumping the catcher box onto the ground or onto a tarp that is placed on the ground.

Existing systems may have the disadvantage of being complicated and not well suited for field installation. Existing dump systems require professional installation equipment, personnel, and a substantial amount of time for installation making retrofitting a dump system to an existing vehicle more costly and inconvenient.

SUMMARY OF THE INVENTION

The present invention overcomes the disadvantages and limitations of the prior art by providing high-clearance dump system with a low center of gravity and an independent dump control system.

The present invention may therefore comprise an interfolding high-clearance dump system comprising: a dump system mount assembly adapted to easily attach to a chassis of a riding mower, said dump system mount assembly comprising: a dump system mount frame that is U-shaped having a left-hand member and a back end and a right-hand member, said left-hand member and said right-hand member spaced apart; a cross-support that connects to said right-hand member and said left-hand member of said dump system mount frame, said cross-support having a center section that is disposed lower than said left-hand member and said right-hand member of said dump mount system; a lift cylinder that pivotally connects at a front end to said cross-support; and a left-hand pivot mount and a right-hand pivot mount that are spaced apart and fixedly connected to said back end of said dump system mount frame, said right-hand pivot mount having a bearing sleeve to support an axle and a ball joint to support a spherical rod end, said left-hand pivot mount having a bearing sleeve to support an axle and a ball joint to support a spherical rod end; a folding lift assembly that pivotally connects to said dump system mount assembly comprising: a lift pivot arm that pivotally connects at a back lower end to said left-hand pivot mount and said right-hand pivot mount of said dump system mount assembly, said lift pivot arm having a center lift pivot mount at a lower end of said lift pivot arm, said center lift pivot mount pivotally connected to said back end of said lift cylinder so that contraction of said lift cylinder exerts a pulling force on said center lift pivot mount which acts as a lever arm that causes said lift pivot arm to pivot and raise; a left-hand lift control rod that pivotally connects at a lower end to said left-hand pivot mount, said left-hand lift control rod being shorter in length than said lift pivot arm; and a right-hand lift control rod that pivotally connects at a lower end to said right-hand pivot mount, said right-hand lift control rod being shorter in length than said lift pivot arm, said lift pivot and said lift control rods folding so that in the lowered folded position, said lift pivot arm and said lift control rods are at least partially interfolded between said left-hand member and said right-hand member of said dump system mount frame to provide a low-profile dump system; a tilting catcher mount assembly that pivotally connects to said folding lift assembly comprising: a catcher mount frame that has: a left-hand member; a back end; and a right-hand member, said left-hand member and said right-hand member spaced apart, said left-hand member having a sleeve bearing at a front end of said left-hand member, said right-hand member having a sleeve bearing at a front end of said right-hand member, said catcher mount frame in the raise position extends back away from said lift pivot arm and said dump system mount frame so that said dump system can be dumped at a location substantially behind said riding mower; a catcher mount axle that is inserted into said sleeve bearings of said left-hand member and said right-hand member of said catcher mount frame, said catcher mount axle also inserted into a sleeve bearing at said upper front end of said lift pivot arm so that said catcher mount frame is pivotally connected to said lift pivot arm so that in the interfolded lowered position said lift pivot arm is partially interfolded between said left-hand member and said right-hand member of said catcher mount frame to provide a low-profile dump system; a cross-support that is fixedly attached to said left-hand member and said right-hand member of said catcher mount frame at a front end of said catcher mount frame; a left-hand bent lever arm that is fixedly connected to said sleeve bearing of said left-hand member of said catcher mount frame; a right-hand bent lever arm that is fixedly connected to said sleeve bearing of said left-hand member of said catcher mount frame, said right-hand bent lever arm forming a ball joint with said right-hand lift control rod and said left-hand bent lever arm forming a ball joint with said left-hand lift control rod so that when said lift pivot arm is raised, said left-hand control rod and said right-hand control rod exert a force on said left-hand bent lever arm and said right-hand bent lever arm that causes said catcher mount frame to be disposed at an obtuse angle with respect to said lift pivot arm so that said back end of said catcher mount frame is higher than said front end of said catcher mount frame to provide high clearance for dumping; a dumping catcher assembly that pivotally connects to said back end of said tilting catcher mount assembly comprising: a catcher box that pivotally connects to said back end of said titling catcher mount assembly, said catcher box having a catcher door that opens when said catcher box is dumped; a dump cylinder that has a front end that pivotally attaches to said catcher mount frame, said dump cylinder having a back end that attached to a lever arm that connects to a shaft, said shaft connecting to a catcher dump pivot arm so that when said dump cylinder is extended a force is exerted which pivots said catcher dump pivot arm which raises a front end of said catcher box higher than said back end of said catcher box so that said tilting catcher mount assembly is at an obtuse angle with respect to said lift pivot arm providing high clearance at said back end of said catcher mount frame, said catcher door opening and dumping when said catcher mount frame is raised and disposed at an obtuse angle with respect to said lift pivot arm; and a power system that control and switches power between said lift cylinder and said dump cylinder comprising: a power unit that is electrically connected to a power system of said riding mower; a switch box having an input that connects to and received power from said power unit, said switch box having a first output that connects to said lift cylinder, said switch box having a second output that connects to said dump cylinder, said switch box switches power from said input between said first output and said second output; a lift switch that causes said switch box to connect power from said input to said lift cylinder; and a dump switch that causes said switch box to connect power from said input to said dump cylinder.

The invention may further comprise a low-profile interfolding frame system for a high-clearance dump system comprising: a dump system mount assembly adapted to easily attach to a chassis of a riding mower, said dump system mount assembly comprising: a dump system mount frame; and a lift cylinder that pivotally connects at a front end to said dump system mount frame; an interfolding lift assembly that pivotally connects to said dump system mount assembly comprising: a lift pivot arm that pivotally connects to said dump system mount assembly, lift pivot arm pivotally connected to a back end of said lift cylinder so that contraction of said lift cylinder causes said lift pivot arm to pivot and raise; at least one lift control rod that pivotally connects at a lower end to said dump system mount frame, said lift control rod being shorter in length than said lift pivot arm said lift pivot arm and said lift control rod interfolding with said dump system mount frame to provide a low-profile dump system; a tilting catcher mount assembly that pivotally connects to said folding lift assembly comprising: a catcher mount frame, said catcher mount frame in the raised position extending back and away from said lift pivot arm and said dump system mount frame so that said dump system can be dumped at a location substantially behind said riding mower; said catcher mount frame being pivotally connected to said lift pivot arm so that in the folded lowered position said lift pivot arm is partially interfolded with said catcher mount frame to provide a low-profile dump system; at least one bent lever arm that is fixedly connected to said catcher mount frame, said bent lever arm forming a ball joint with said lift control rod so that when said lift pivot arm is raised, said control rod exerts a force on said bent lever arm that causes said catcher mount frame to be disposed at an obtuse angle with respect to said lift pivot arm so that said back end of said catcher mount frame is higher than said front end of said catcher mount frame to provide high clearance.

The invention may further comprise a high-clearance dump system comprising: a dump system mount assembly adapted to easily attach to a chassis of a riding mower, said dump system mount assembly comprising: a dump system mount frame; and a lift cylinder that pivotally connects at a front end to said dump system mount frame; a lift assembly that pivotally connects to said dump system mount assembly comprising: a lift pivot arm that pivotally connects at a back lower end to said dump system mount assembly, said lift pivot arm pivotally connecting to a back end of said lift cylinder so that contraction of said lift cylinder exerts a pulling force that causes said lift pivot arm to pivot and raise; and at least one control rod that pivotally connects at a lower end to said dump system mount frame, said left-hand lift control rod being shorter in length than said lift pivot arm; a tilting catcher mount assembly that pivotally connects to said folding lift assembly comprising: a catcher mount frame that in the raised position extends back away from said lift pivot arm and said dump system mount frame so that said dump system can be dumped at a location substantially behind said riding mower, said catcher mount frame pivotally connecting to said lift pivot arm; at least one bent lever arm that is fixedly connected to said catcher mount frame, said bent lever arm pivotally connect to said lift control rod so that when said lift pivot arm is raised, said control rod exerts a force on said bent lever arm that causes said catcher mount frame to be disposed at an obtuse angle with respect to said lift pivot arm so that said back end of said catcher mount frame is higher than said front end of said catcher mount frame to provide high clearance for dumping; a dumping catcher assembly that pivotally connects to said back end of said tilting catcher mount assembly comprising: a catcher box that pivotally connects to said back end of said titling catcher mount assembly; and a dump cylinder that pivotally connects to said catcher mount frame and to a lever arm that connects to a shaft, said shaft connecting to a catcher dump pivot arm so that when said dump cylinder is extended a force is exerted which raises a front end of said catcher box higher than said back end of said catcher box; and a power system that control and switches power between said lift cylinder and said dump cylinder.

BRIEF DESCRIPTION OF THE DRAWINGS

In the drawings,

FIG. 6 illustrates the frames and lift pivot arm of the embodiment of FIG. 1B interfolded together in a lowered position.

DETAILED DESCRIPTION OF THE INVENTION

Figure 1A:
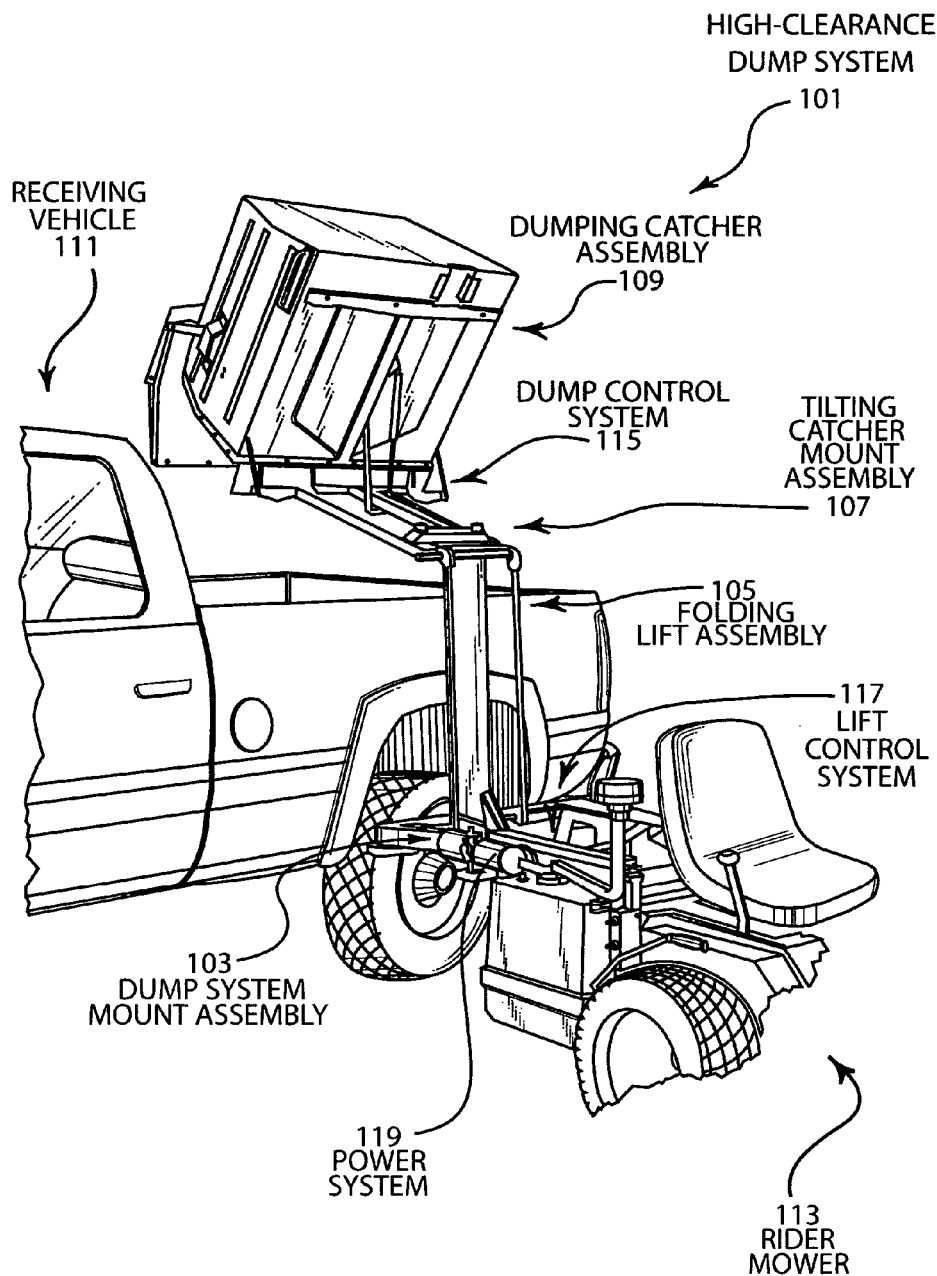
FIG. 1A is an illustration of an embodiment of a high-clearance dump system dumping into a receiving vehicle.

FIGS. 1A illustrates an embodiment of a high-clearance dump system 101 that is dumping into a receiving vehicle 111. In the embodiment of FIG. 1A, the high-clearance dump system 101 is attached to a riding mower 113.

For purposes of this specification, LH or left-hand refers to the side closest to the left-hand of a seated rider facing forward. RH or right-hand refers to the side closest to the right-hand of a seated rider facing forward. Additionally, front refers to the end closest to the front of riding mower 113 as viewed by a seated rider facing forward. Rear refers to the end farthest from the front of riding mower 113 as viewed by a seated rider facing forward.

A dump system mount frame 103 is attached to the back portion of the chassis of riding mower 113. The back end of folding lift assembly 105 is connected to the dump system mount assembly 103 so that folding lift assembly 105 pivots with respect to dump system mount assembly 103. As folding lift assembly 105 pivots, the front end of folding lift assembly 105 is raised and becomes the upper end. A front end of lift control system 117 is connected to dump system mount assembly 103 and a back end of lift control system 117 is connected to the front lower end of folding lift assemble 105. Lift control system 117 is connected to and receives power from power system 119.

High clearance dump mount system 101 includes a tilting catcher mount assembly 107 that has a back-end farthest from the rider seat and a front-end closest to the rider seat. The front-end of tilting catcher mount assembly 107 connects to the upper end of folding lift assembly 105 so that as the upper end of folding lift assembly 105 is raised, tilting catcher mount assembly 107 is maintained in a position with the back end higher than the front end. In the fully raised position, the back end of tilting catcher mount assembly 107 is approximately 10 inches higher than the front end.

The high-clearance provided by maintaining the back end of the tilting catcher mount assembly 107 higher than the front end in the raised position prevents potential collisions of the dumping catcher assembly 109 with objects such as the sides of a truck bed that require high clearance, for example a four wheel drive vehicle that has a "lift kit" installed or larger trucks, such as dump trucks. Likewise, high clearance provides an advantage when dumping over a dumpster wall or a structural wall surrounding a dumpster. In the raised position, the back end of tilting catcher mount assembly 107 extends away from the riding mower 113 so that the contents of dumping catcher assembly 109 may dump into receiving vehicle 111 at a location that is not directly over or next to the wall of receiving vehicle 111. This reduces the need for redistribution of the dumped contents and also reduces the likelihood of spillage.

A dump control system 115 is connected to tilting catcher mount assembly 107. Dump control system 115 controls the raising and lowering of dumping catcher assembly 109. The back end of dumping catcher assembly 109 is connected to the back-end of tilting catcher mount assembly 107 so that it may pivot. The front end of dumping catcher mount assembly 109 may be raised which causes the contents of dumping catcher assembly 109 to be dumped. Dump control system 115 connects to, and receives power from, power system 119.

Lift control system 117 that is used for lifting folding lift assembly 105 and dump control system 115 that is used for tilting dumping catcher assembly 109 operated separately. These separate controls allow dumping of the dumping catcher assembly 109 to occur when folding lift assembly 105 is in any desired position such as a fully raised position, a partially raised position, or a lowered position.

In a lowered position, folding lift assembly 105 interfolds partially into tilting catcher mount assembly 107, and also interfolds partially into dump system mount assembly 103. The interfolding together of these assemblies provides a low-profile high clearance dump system that allows the dumping catcher assembly 109 to be only slightly higher than if the dumping catcher assembly 109 were mounted directly to the dump system mount assembly 103 without tilting catcher assembly 107 and without folding lift assembly 105.

Figure 1B:
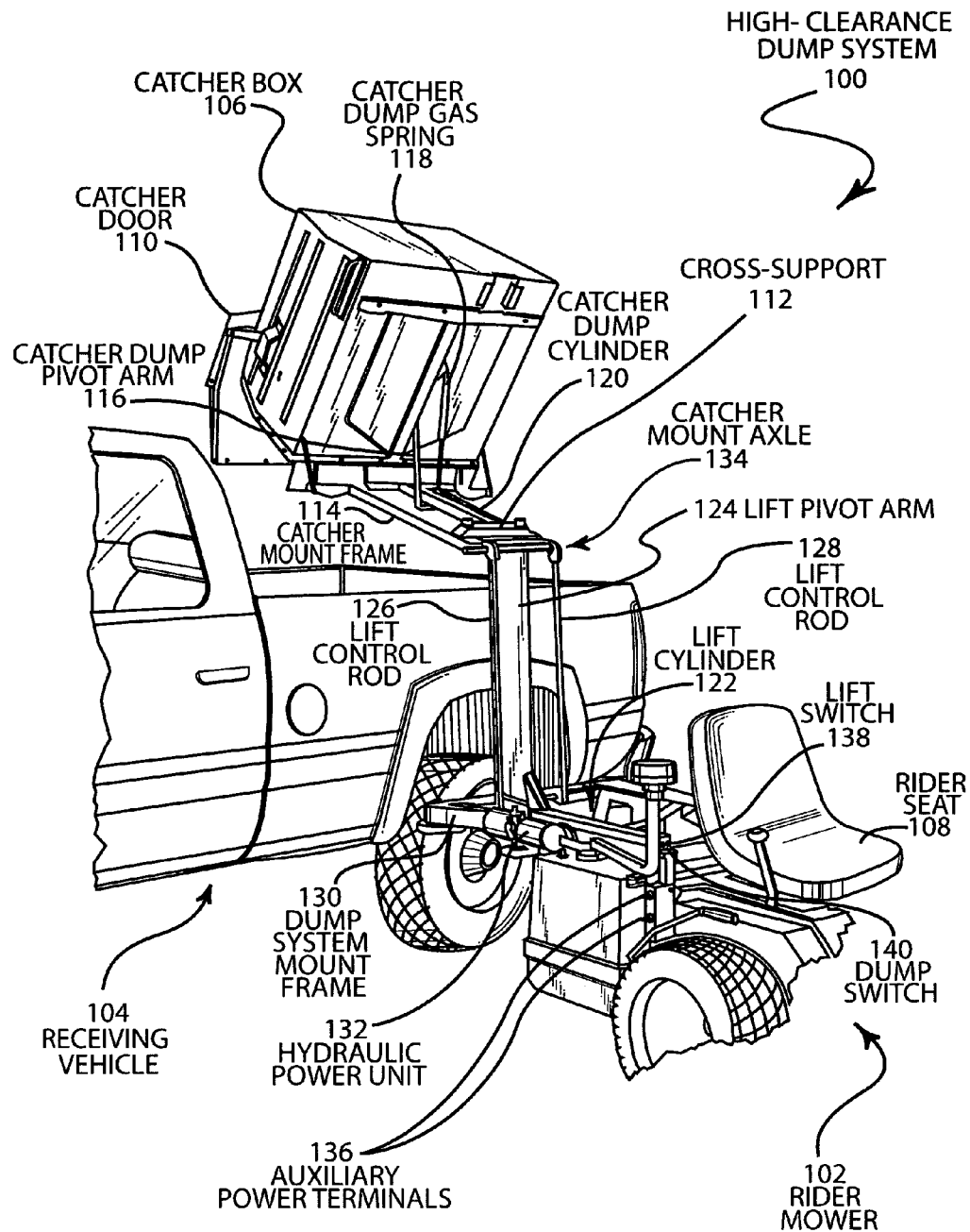
FIG. 1B illustrates additional details of the embodiment of FIG. 1A.

FIG. 1B illustrates additional details of a high-clearance dump system 100. High clearance dump system 100 is attached to riding mower 102 and is shown dumping into a receiving vehicle 104.

A dump system mount frame 130 is attached to the back portion of the chassis of riding mower 102. A lift pivot arm 124 is attached to the dump system mount frame 130 so that the back end of lift pivot arm 124, pivots with respect to dump system mount frame 130. The pivoting of the lift pivot arm 124 causes the front end of the lift pivot arm 124 to be raised or lowered.

High clearance dump mount system 100 includes a catcher mount frame 114 that has a back-end farthest from the rider seat 108 and a front-end closest to the rider seat. The front-end of catcher mount frame 114 is pivotally attached to lift pivot arm 124 by catcher mount axle 134. Cross-support 112 is attached to a top side of catcher mount frame 114 near the front end. The upper end of a left-hand lift control rod 128 is pivotally connected to the catcher mount frame 114. The lower end of left-hand lift control rod 128 is pivotally connected to dump system mount frame 130. The length of the lift control rod 128 is shorter than the length of lift pivot arm 124 so that as lift pivot arm 124 is raised, the front end of catcher mount frame 114 is pulled by lift control rod 128 which causes the back end of catcher mount frame 114 to be raised and maintained at an angle. This clearance angle causes the back end of the catcher mount frame 114 to be higher than the front end of catcher mount frame 116 resulting in high-clearance. The upper end of right-hand lift control rod 126 is pivotally connected at an upper-end to the catcher mount frame 114. The lower end of the right-hand lift control rod 126 is connected to the dump system mount frame 130.

A catcher box 106 is attached to the back-end of the catcher mount frame 114 so that it may tilt and dump. The high clearance dump system 100 includes a catcher dump pivot arm 116 that pivots and raises the front-end of the catcher box 106 that is nearest the driver. In the embodiment of FIG. 1B, one end of a catcher dump gas spring 118 connects to catcher box 106. The other end of catcher dump gas spring 118 connects to catcher mount frame 114. Catcher dump gas spring 118 dampens the tilting and un-tilting actions of catcher box 106 which provides a smooth and controlled tilting and dumping.

As the front end of catcher box 106 is raised with respect to the back end of catcher box 106, catcher door 110 automatically opens. Catcher door opening and closing is described below with respect to FIGS. 13, 14 and 15. With the catcher door 110 open and the catcher box 106 tilted with the front end higher than the back end, grass clippings or other contents that have accumulated in catcher box 106 are dumped into receiving vehicle 104.

Catcher dump pivot arm 116 is connected to a catcher dump cylinder 120. In the embodiment of FIG. 1B, catcher dump cylinder 120 is a double-acting hydraulic cylinder that is connected to a hydraulic power unit 132. When catcher dump cylinder 120 is elongated, i.e., the shaft of the cylinder is extended by the force of hydraulic pressure, it causes catcher pivot arm 116 to pivot and raise the front end of catcher box 106. When catcher dump cylinder 120 is contracted, it causes catcher pivot arm 116 to pivot in the opposite direction and lowers the front end of catcher box 106.

In the embodiment of FIG. 1B, the catcher mount frame 114, cross-support 112, lift pivot arm 124, and dump system mount frame, are made of rectangular steel tubing members that welded together to form frames. However, the structural frame members of the various assemblies described above may be of any material that is adequately strong and enables the assemblies to interfold together.

Figure 7A:
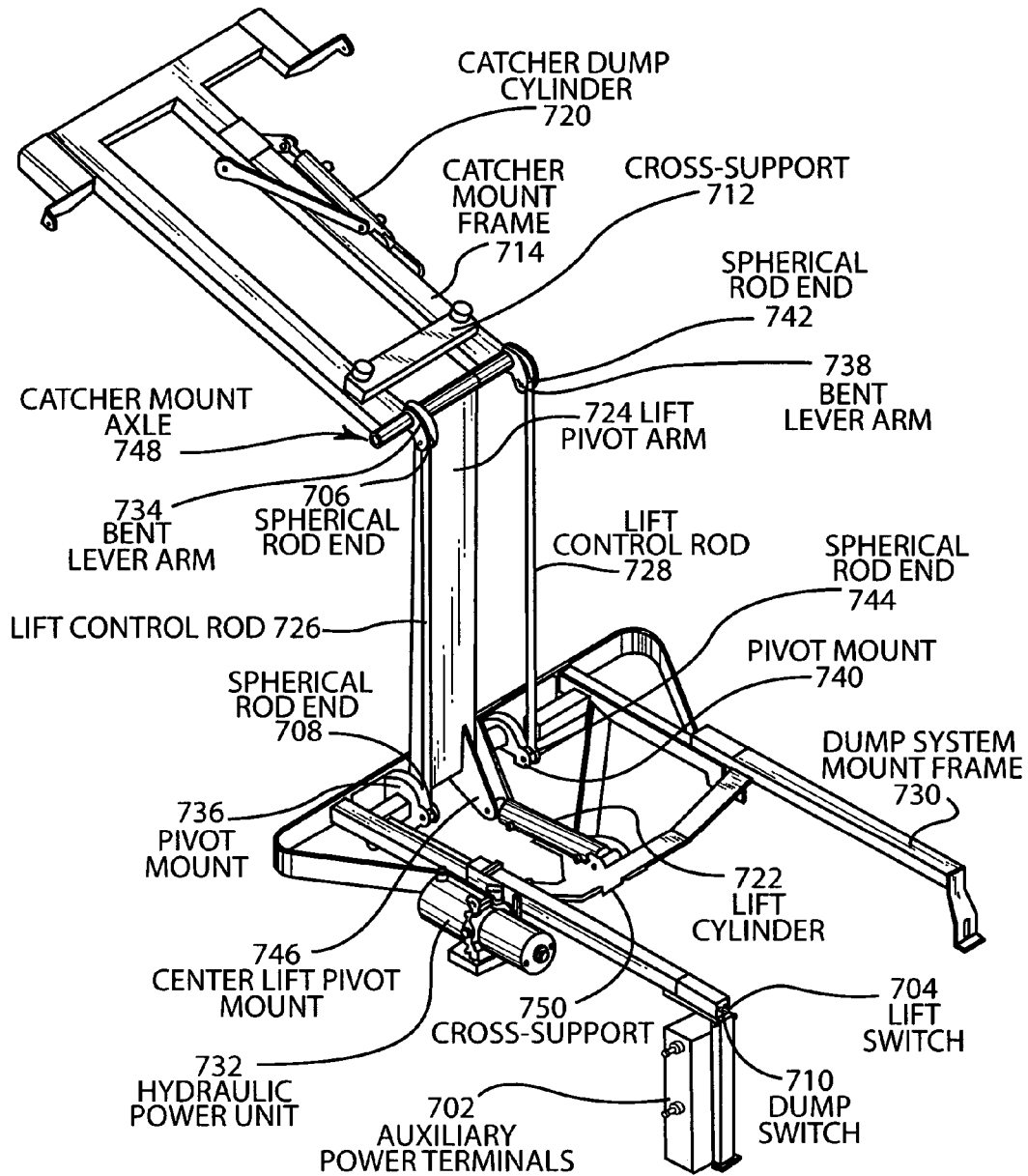
FIG. 7A illustrates the frames and lift pivot arm of the embodiment of FIG. 1B unfolded in a raised position.

Lift pivot arm 124 is connected to a lift cylinder 122. The approximate location of lift cylinder 122 is indicated in FIG. 1B. Lift cylinder 122 is shown in FIGS. 7A and 1B below. In the embodiment of FIG. 1B, lift cylinder 122 is a hydraulic cylinder that is connected to a hydraulic power unit 132. When lift cylinder 122 is contracted, it causes lift pivot arm 124 to pivot and raise the front end of lift pivot arm 124 and thus raises catcher mount frame 114. When lift cylinder 122 is elongated, it causes lift pivot arm 124 to pivot in the opposite direction and lowers catcher mount frame 114.

In the embodiment of FIG. 1B, catcher dump cylinder 120 and lift cylinder 122 are hydraulic cylinders. However, other embodiments may include a similar catcher dump cylinder and a lift cylinder that are electrically actuated. One advantage of the embodiment of FIG. 1B of the present invention is that catcher dump cylinder 120 and lift cylinder 122 may be actuated separately to allow raising without dumping, and dumping without raising, as well as raising and dumping at various positions and at different times. Thus a high clearance dump system with independent tilt control is provided.

Figure 2:
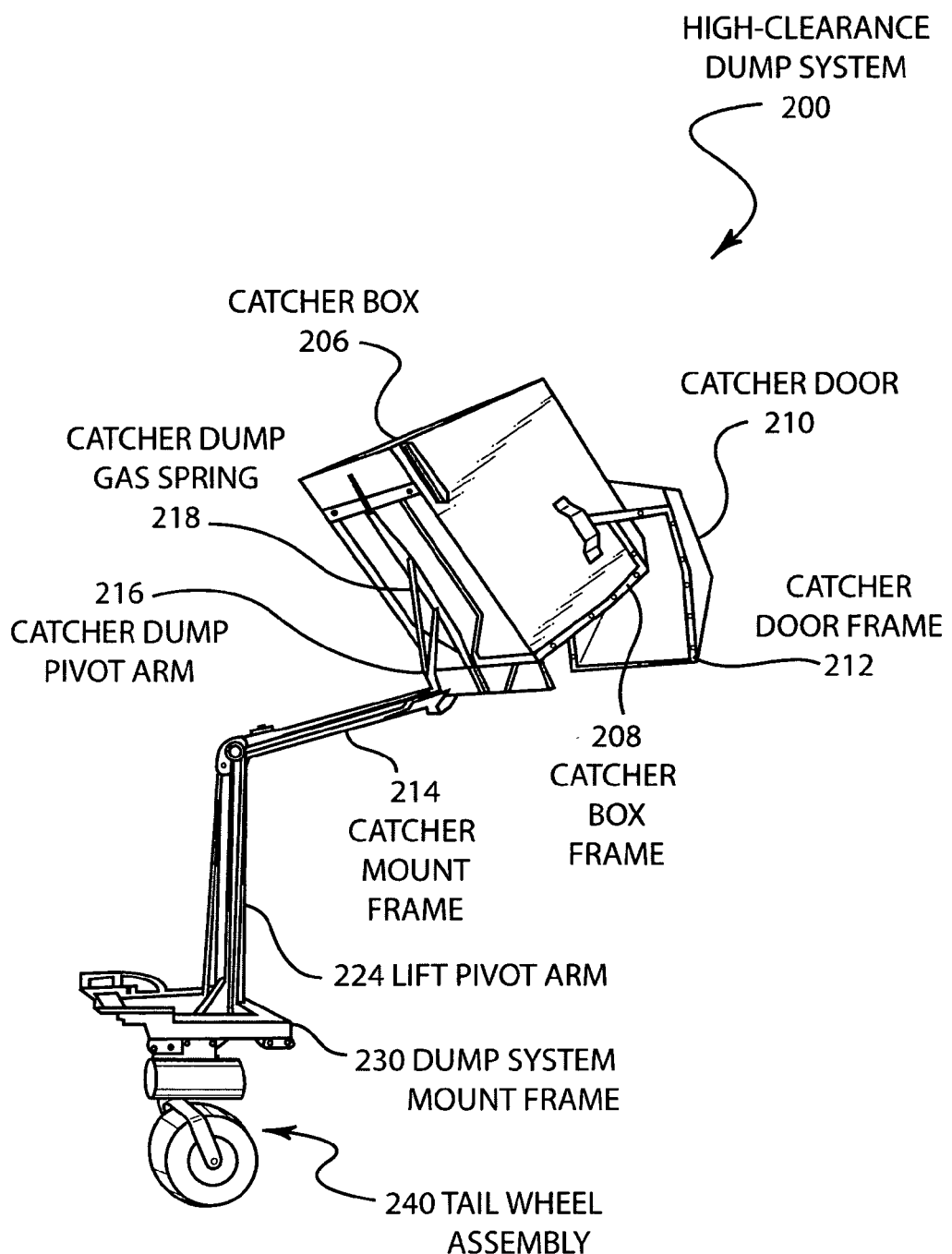
FIG. 2 is an illustration of selected components of the embodiment of FIG. 1B of a high-clearance dump system in a raised and dumping position.

FIG. 2 is an illustration of selected components of the embodiment of FIG. 1B of a high-clearance dump system in a raised and dumping position. In FIG. 2, high-clearance dump system 200 is shown with the lift pivot arm 224 raised. The back of catcher mount frame 214 is higher than the front end of catcher mount frame 214 and thus provides high-clearance. The front end of catcher mount frame 214 is pivotally connected to lift pivot arm 224. Catcher dump pivot arm 216 is raised which causes the front end of catcher box 206 to be higher than the back end of catcher box 206 which causes catcher door 210 to open, as described below in the descriptions of FIGS. 13, 14, and 15. Catcher dump gas spring 218 causes the dumping action of catcher box 206 to be smooth.

A catcher box frame 208 is attached to the back end of catcher box 206 around a outside perimeter of catcher box 206. Catcher box frame 208 provides additional strength to catcher box 206 and prevents warping of the edges of catcher box 206. Similarly, catcher door 210 includes an catcher door frame 212 that is attached to the edges of catcher door 210 which strengthens catcher door 210 and prevents it from warping.

Tail wheel assembly 240 is attached to dump system mount frame 230 in a way that allows it to swivel. Tail wheel assembly 240 provides support for the weight of the high clearance dump system 200. This is advantageous when the catcher box 206 is full of grass clippings or other materials. The weight of the full catcher box 206 exerts force on the catcher mount frame 214 which acts as a moment arm. This force is transferred to the lift pivot arm 224 and the dump system mount frame 230. The tail wheel assembly 240 provides a compensating force and is also able to rotate and swivel as needed during operation of the mower.

Figure 3:
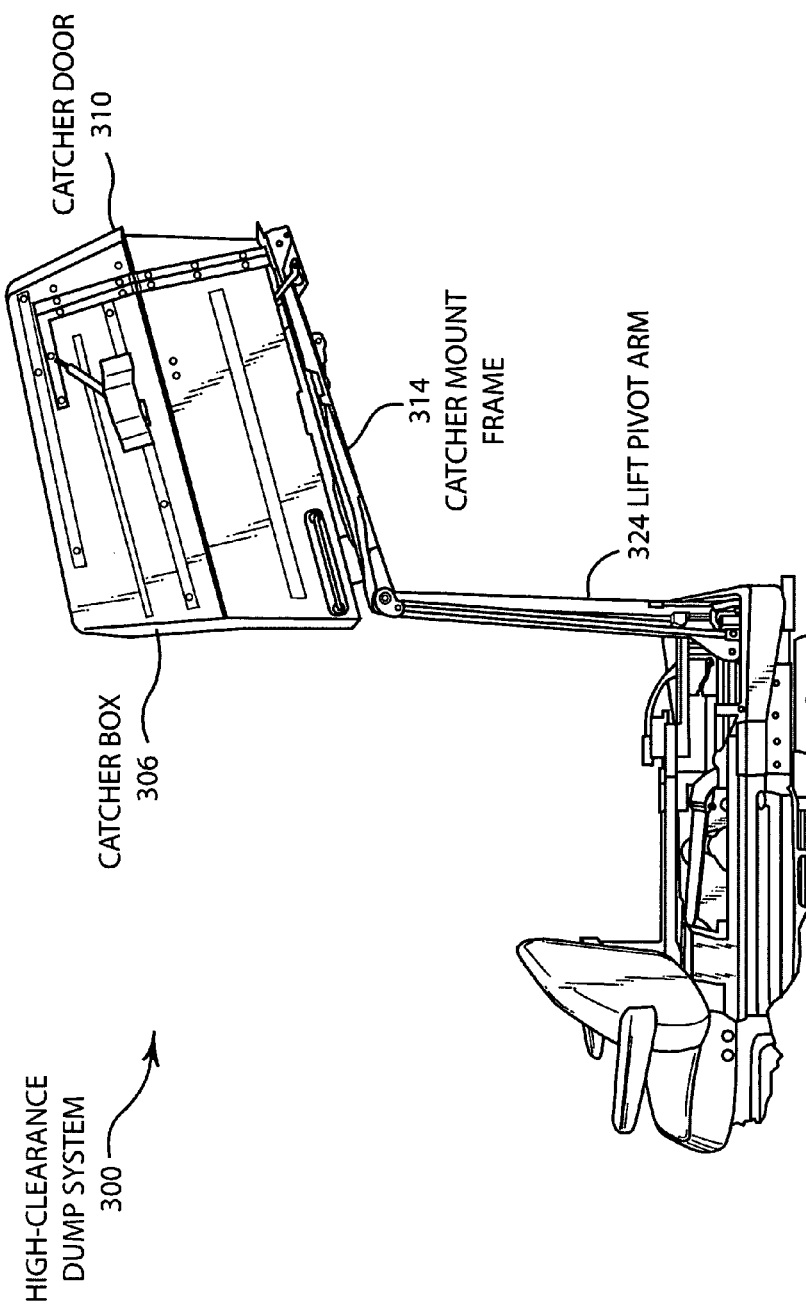
FIG. 3 is side view of the embodiment of FIG. 1B of a high-clearance dump system in a raised and non-dumping position.

FIG. 3 is side view of the embodiment of FIG. 1B of a high-clearance dump system in a raised and non-dumping position. High-clearance dump system 300 has the advantage that when lift pivot arm 324 is raised, the back end of catcher mount frame 314 is kept higher than the front end of catcher mount frame 314. This provides high clearance as described above. Additionally, clippings or other contents of catcher box 306 will slide towards the front of catcher box 306 which inhibits the contents from sliding against catcher door 310 and spilling out.

Figure 4:
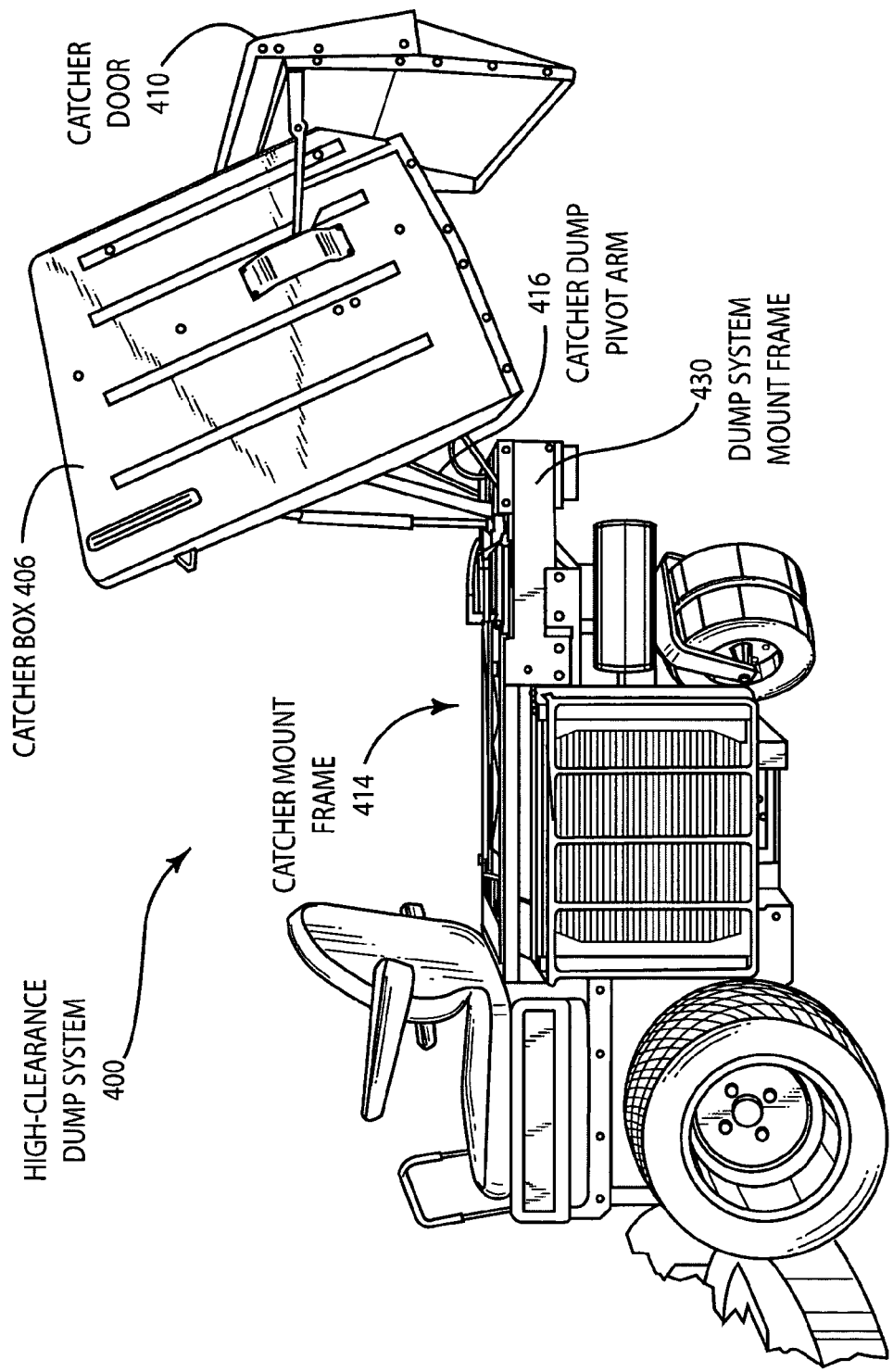
FIG. 4 is side view of the embodiment of FIG. 1B of a high-clearance dump system in a lowered and dumping position.

FIG. 4 is side view of the embodiment of FIG. 1B of a high-clearance dump system in a lowered and dumping position. In some applications, it may be desirable to dump the contents of catcher box 406 without raising the catcher mount frame 414. For example, a tarp may be spread on the ground and the contents of catcher box 406 may be dumped on the tarp. In such an application, spillage may be lessened by keeping catcher mount frame 414 in a lowered position with respect to dump system mount frame 430. Tilting and dumping of catcher box 406 with the catcher mount frame 414 in a lowered position is controlled substantially the same as tilting and dumping the catcher box in a raised position as described above with respect to FIG. 1B. Catcher dump pivot arm 416 pivots which raises the front end of catcher box 406. Catcher door 410 opens and the contents of catcher box 406 are dumped.

Figure 5:
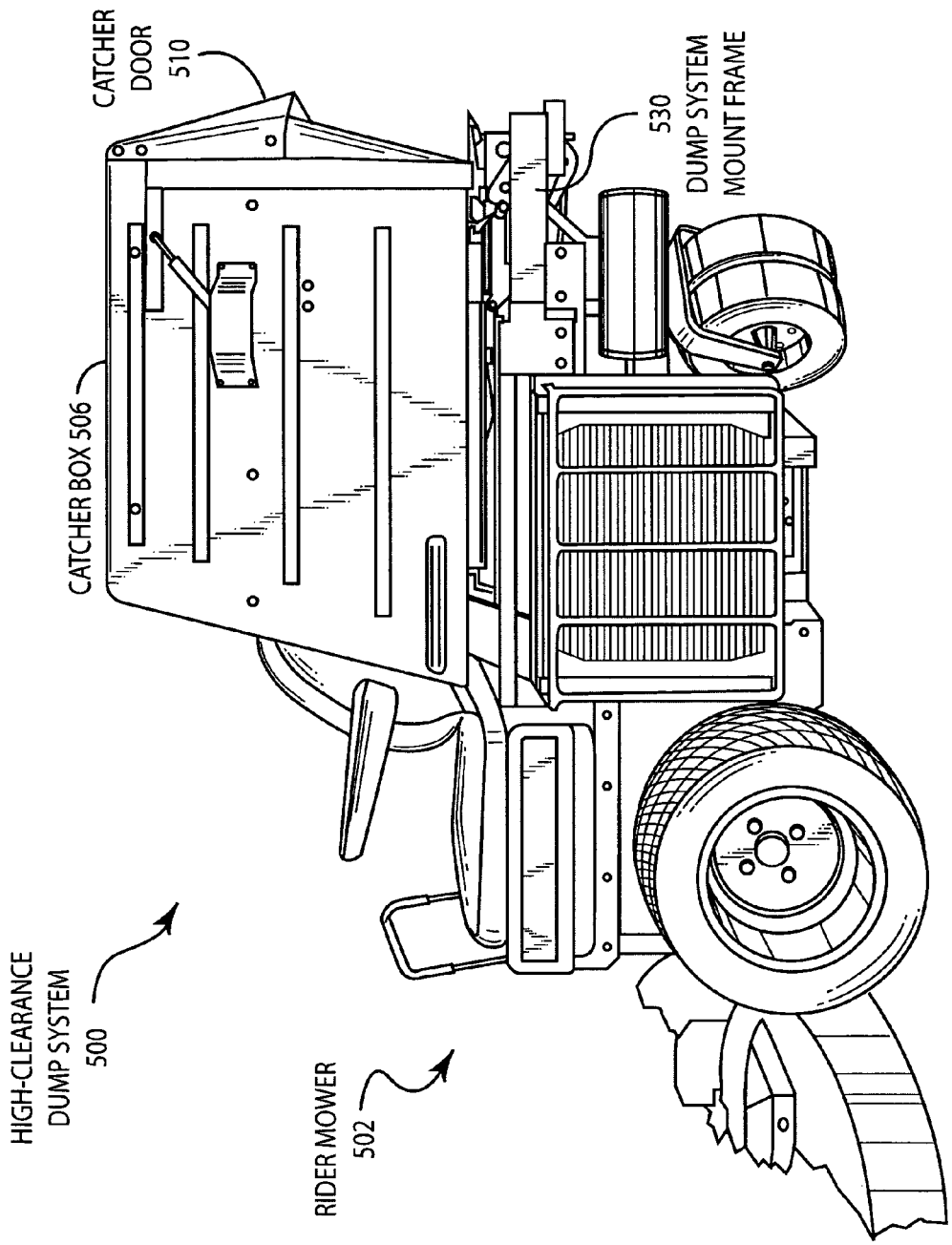
FIG. 5 is side view of the embodiment of FIG. 1B of a high-clearance dump system in a lowered and non-dumping position.

FIG. 5 is side view of the embodiment of FIG. 1B of a high-clearance dump system in a lowered and non-dumping position. In the lowered position, catcher door 510 is closed. One advantage of high-clearance dump system 500 is that it provides versatile dumping and high clearance and at the same time has a low-profile, e.g. the height of the catcher box 506 with the high clearance dump system 500 installed is only slightly higher than if no high clearance dump system 500 were installed and catcher box 506 were directly connected to dump system mount frame 530 of riding mower 502. In the embodiment of FIG. 1B, the height of the catcher box 506, with high clearance dump system 500 installed, is only 3.25 inches greater than if no high clearance dump system were installed. This low-profile design provides a lower center of gravity and thus better stability and maneuverability. The low-profile of the catcher box 506 may also facilitate transportation and storage of riding mower 502 that has a high clearance dump system 500 installed.

FIG. 6 illustrates the frames and lift pivot arm of the embodiment of FIG. 1B interfolded together in a lowered position. When the high clearance dump system of the embodiment of FIG. 1B is in a lowered interfolded position, the lift pivot arm 624 is pivoted and lowered towards the dump system mount frame 630. The catcher mount frame pivotally which is connected to the lift pivot arm 624 is thereby also lowered. At least a portion of lift pivot arm 624 interfolds into dump system mount frame 630 so that at least a portion of pivot arm 624 is positioned between the structural frame members of the dump system mount frame 630. At least a portion of the lift pivot arm 624 interfolds into catcher mount frame 614. This interfolding action provides a combined dump system mount frame 630, lift pivot arm 624, and catcher mount frame 614, that have a combined height that is less than the sum of the heights of the individual components.

Figure 17:
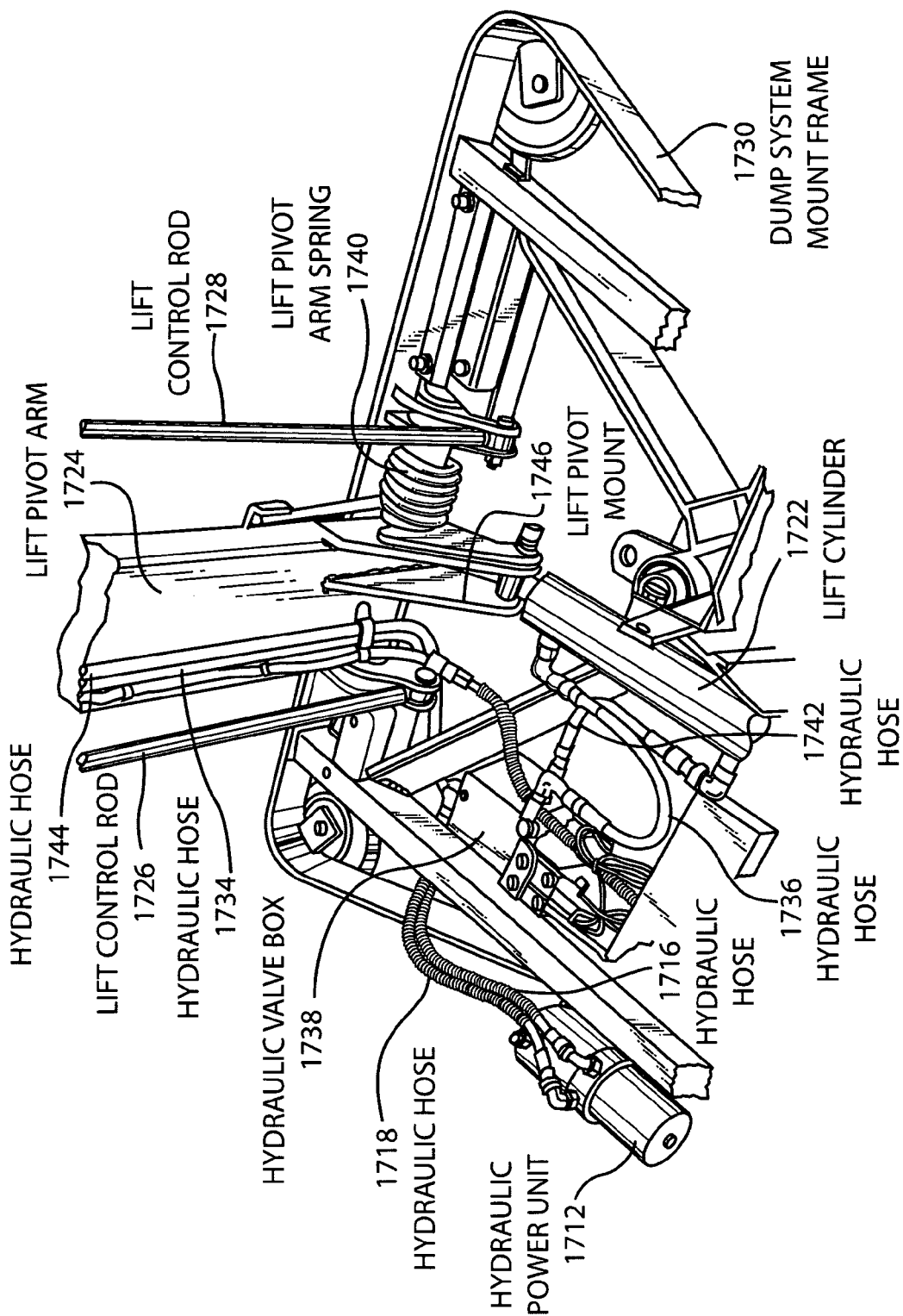
FIG. 17 illustrates the lift control system of an embodiment of the embodiment of FIG. 1B.

Also illustrated in FIG. 6 is the positioning of hydraulic power unit 632 which is connected to an outer edge of dump system mount frame 630. Attachment to the exterior edge of the frame leaves the interior part of dump system mount frame 630 open to accommodate lift pivot arm 624 and catcher mount frame 614 in the lowered, interfolded position. Hydraulic hoses 634 and 640 are each connected at one end to hydraulic power unit 632. One hydraulic hose acts as a hydraulic pressure providing hose and the other hydraulic hose acts as a return hose. The other end of hydraulic hoses 634 and 640 are connected to a hydraulic valve box that acts as a power switch box. The hydraulic valve box is described below with respect to FIG. 17. The hydraulic valve box also connects to one end of hydraulic hoses 636 and 638. Hydraulic hoses 636 and 638 connect to the catcher dump cylinder 620 with one hose acting as a pressure providing hose and the other hose acting as a return hose.

Catcher box 606 is illustrated in the dumping position. When catcher dump cylinder 620 is elongated, the elongation of the cylinder causes catcher dump pivot arm 616 to pivot, which raises the front end of catcher box 606. Catcher dump gas spring 618 which is connected at one end to catcher box 606 and at the other end to the catcher mount frame 614, dampens the dumping motion so that it is smooth and un-abrupt.

FIG. 7A illustrates the frames and lift pivot arm of the embodiment of FIG. 1B unfolded in a raised position. The front end of lift cylinder 722 pivotally connects to cross-support 750 of dump system mount frame 730. The back end of lift cylinder 722 pivotally connects to center lift pivot mount arm 746 which is part of the lower back end of lift pivot arm 724. When lift cylinder 722 contracts, lift pivot arm 724 pivots which raises the end of lift pivot arm 724 that is connected to catcher mount frame 714.

As lift pivot arm 724 is pivoted and raised, lift control rods 726 and 728 also pivot and are raised. The length of lift control rods 726 and 728 is shorter than the length of lift pivot arm 724, so that when lift pivot arm 724 is raised, a lever force is exerted on bent lever arms 734 and 738 which are fixedly connected to catcher mount frame 714. This lever force causes the back end of catcher mount frame 714 to be raised higher than the front end of catcher mount frame 714 so that catcher mount frame 714 is at an obtuse angle with respect to lift pivot arm 724 This obtuse angle provides higher clearance at the back end of catcher mount frame 714.

Lift control rod 726 has an upper end that has a threaded spherical rod end 706 that forms a ball joint with bent lever arm 734. A lower end of lift control rod 728 has a threaded spherical rod end 744 that is connected to a pivot mount 740. Pivot mount 740 is fixedly connected to dump system mount frame 730. A lower end of lift control rod 726 has a threaded spherical rod end 708 that is connected to a pivot mount 736. Pivot mount 736 is fixedly attached to dump system mount frame 730. Likewise, an upper end of lift control rod 728 has a threaded spherical rod end 742 that forms a ball joint with bent lever arm 738. Bent lever arm 738 is fixedly connected to catcher mount frame 714. A lower end of lift control rod 728 has a threaded spherical rod end 744 that is connected to a pivot mount 740. Pivot mount 740 is fixedly attached to dump system mount frame 730. Hardened spherical rod ends such as spherical rod ends 706, 708, 742, 744 may be obtained from the National Rod End Division of Tuthill Linkage Group, New Haven, Ind. Lift control rods 726 and 728 are also shorter than lift pivot arm 724 which allows lift pivot arm 724 to be interfolded into dump system mount frame 730 in a low-profile closed position.

Cross-support 750 is lower than dump system mount frame 730 to accommodate lift pivot arm 724 and lift control rods 726 and 728 when they interfold into dump system mount frame 730. Cross-support 750 also provides strength to dump system mount frame 730 and prevents side-to-side torsion or warping of dump system mount frame 730.

Figure 7B:
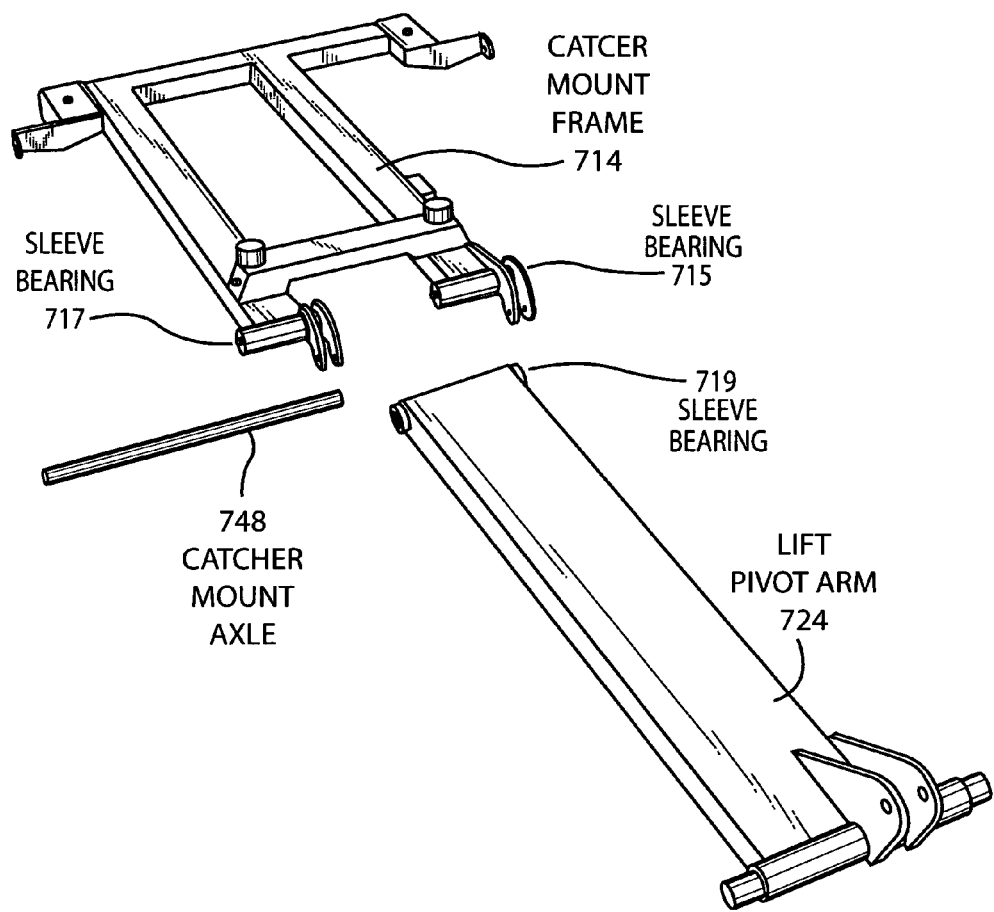
FIG. 7B illustrates the catcher mount frame, catcher mount axle, and lift pivot arm of the embodiment of FIG. 1B in an assembly view.

Cross-support 712 is attached to the top of catcher mount frame 714 and accommodates a portion of lift pivot arm 724 in the interfolded lowered position. Catcher door pull rod mounts 700 and 718 are attached to catcher mount frame 714 and FIG. 7B is an assembly drawing of the components of the folding lift assembly 105 as described above with respect to FIG. 1A. Catcher mount frame 714 includes a left-hand sleeve bearing 715 and a right-hand sleeve bearing 717. Lift pivot arm 724 includes sleeve bearing 719 which is sized to fit between sleeve bearing 715 and sleeve bearing 717 so that catcher mount axle 748 may be inserted into sleeve bearings 717, 719, and 715 which allows catcher mount frame 714 to pivot with respect to lift pivot arm 724.

Figure 8:
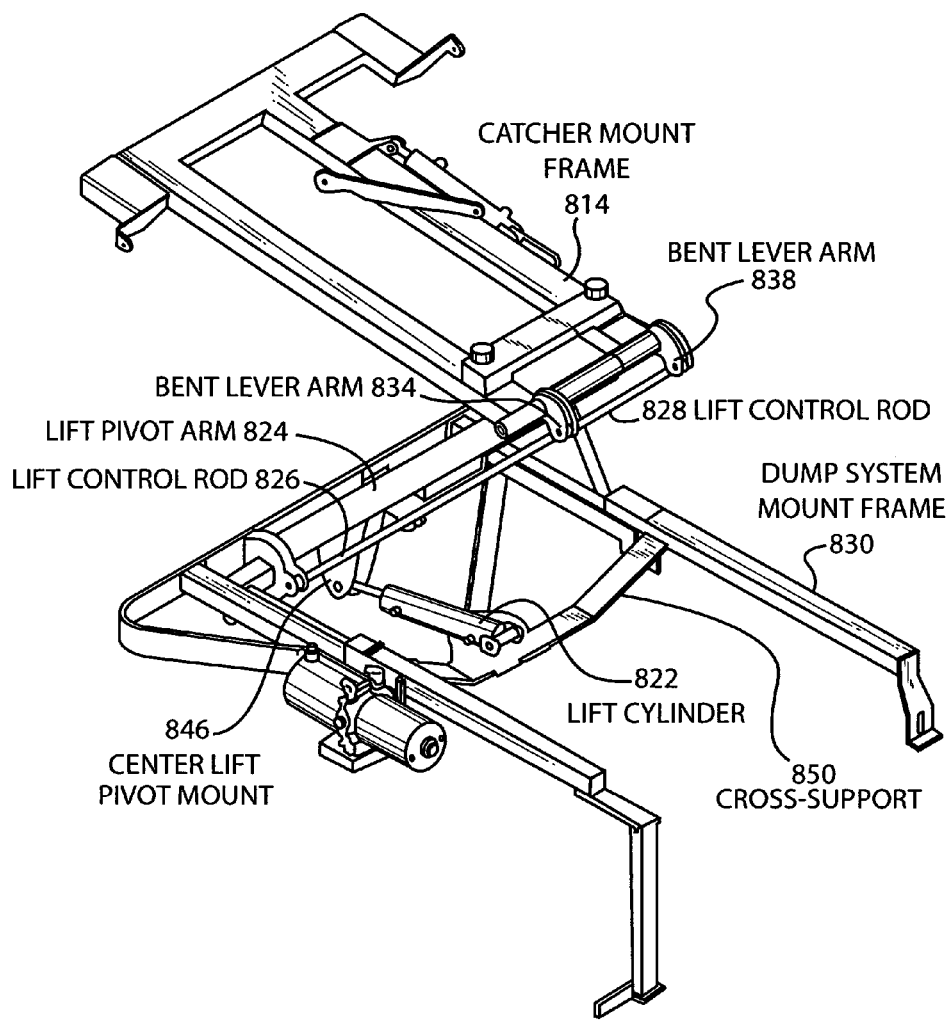
FIG. 8 illustrates the frames and lift pivot arm of the embodiment of FIG. 1B unfolded in a partially-raised position.

FIG. 8 illustrates the frames and lift pivot arm of the embodiment of FIG. 1 unfolded in a partially-raised position. Lift cylinder 822 is partially contracted which pulls on lift pivot mount 846. The force of lift cylinder 822 pulling on lift pivot mount 846 causes lift pivot arm 824 to partially pivot and thus be partially raised. Lift control rods 826 and 828 also pivot and as lift pivot arm 824 is partially raised, tension on pivot mounts 834 and 838 causes a lever force that raises the back end of catcher mount frame 814 relative to the front end of catcher mount frame 814 which is connected to lift pivot arm 824.

Figure 9:
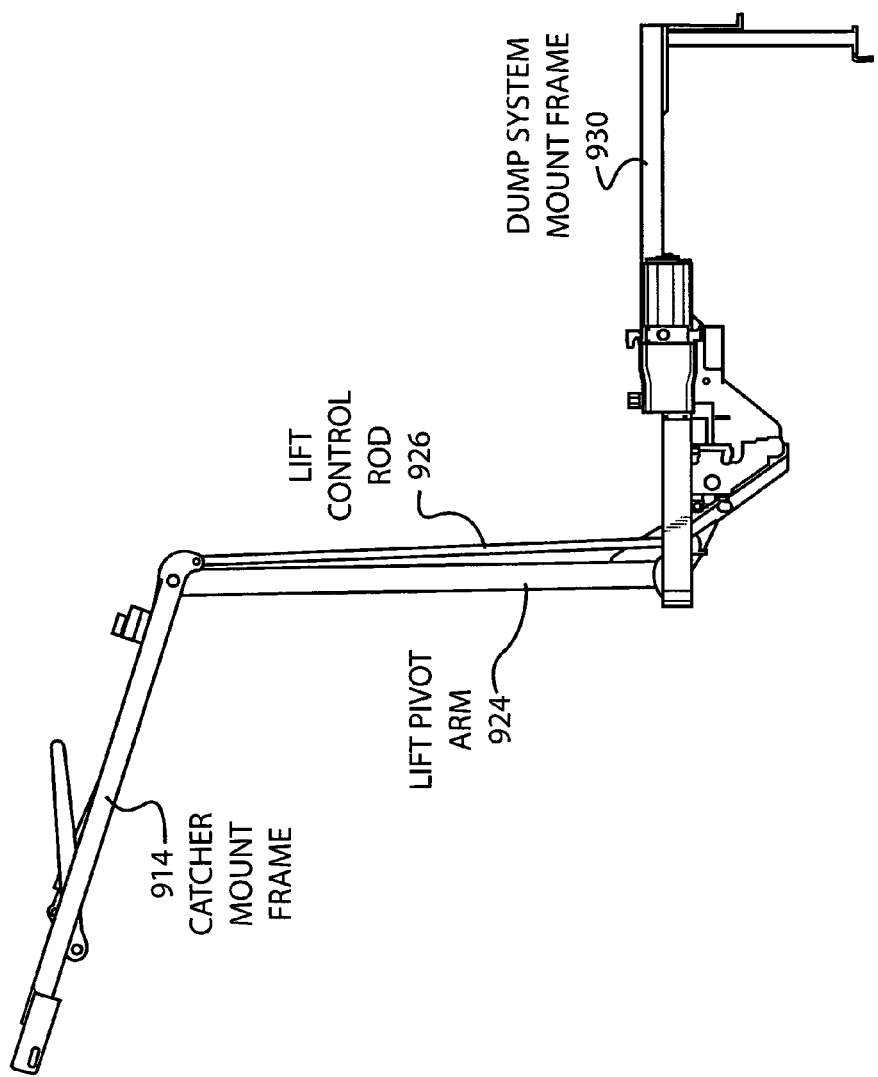
FIG. 9 is a side view of the frames and lift pivot arm of the embodiment of FIG. 1B in a raised position.

FIG. 9 is a side view of the frames and lift pivot arm of the embodiment of FIG. 1 in a raised position. Lift pivot arm 924 is fully pivoted and raised to a substantially vertical position which is substantially perpendicular to dump system mount frame 930. Tension from lift control rod 926 causes a lever force which raises the back end of catch mount frame 914 higher than the front end of catcher mount frame 914 to provider high clearance at the back end.

Figure 10:
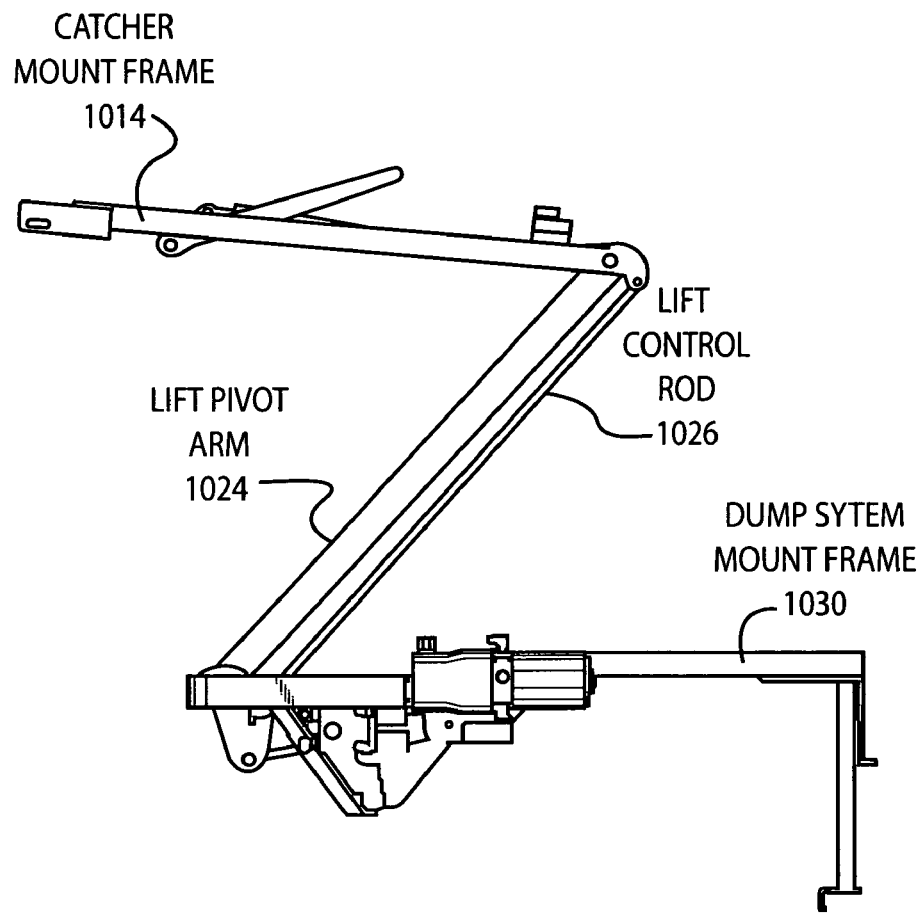
FIG. 10 is a side view of the frames and lift pivot arm of the embodiment of FIG. 1B in a partially raised position.

FIG. 10 is a side view of the frames and lift pivot arm of the embodiment of FIG. 1 in a partially raised position. Lift pivot arm 1024 is partially pivoted and raised to an acutely angled position with respect to dump system mount frame 1030. Tension from lift control rod 1026 causes a lever force which begins to raise the back end of catch mount frame 1014 higher than the front end of catcher mount frame 1014.

Figure 11:
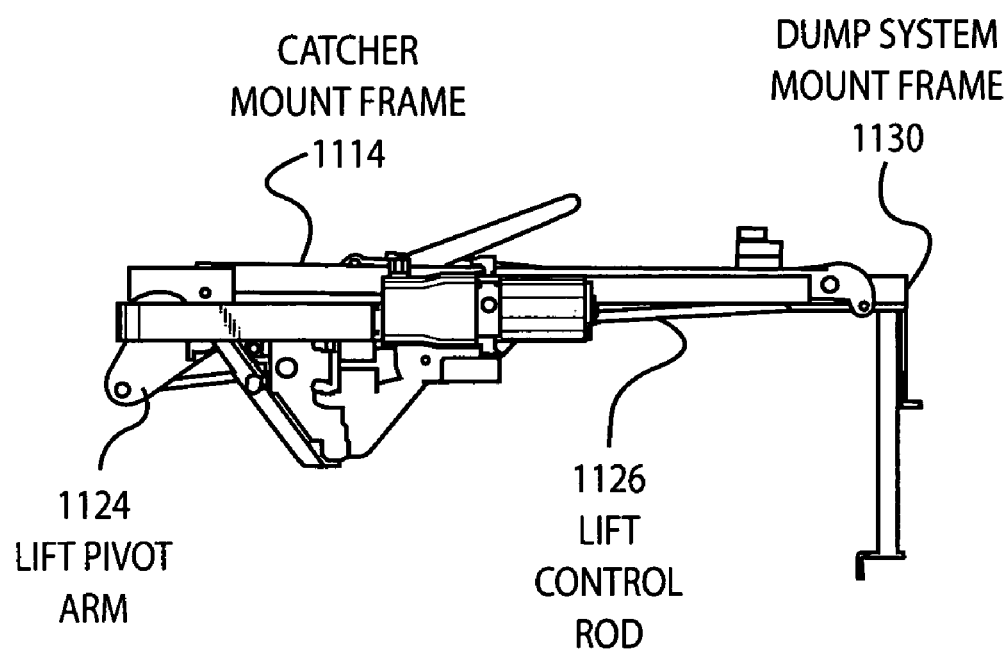
FIG. 11 is a side view of the frames and lift pivot arm of the embodiment of FIG. 1B interfolded in a lowered position.

FIG. 11 is a side view of the frames and lift pivot arm of the embodiment of FIG. 1 interfolded together in a lowered position. Lift pivot arm 1124 is lowered to a narrowly angled position with respect to dump system mount frame 1130 so that lift pivot arm 1124 is at least partially interfolded into dump system mount frame 1130. Lift pivot arm 1124 is also at least partially interfolded into catcher mount frame 1114. Thus, in the lowered position, catcher mount frame 1114, lift pivot arm 1124, and dump system mount frame 1130 are interfolded together so that their combined height is less that the sum of their individual heights. The additional height for a catcher box mounted to the high clearance dump system of FIG. 1 compared with a catcher box mounted to a manual dump system is approximately 3.25 inches which maintains good vehicle stability and maneuverability.

Figure 12:
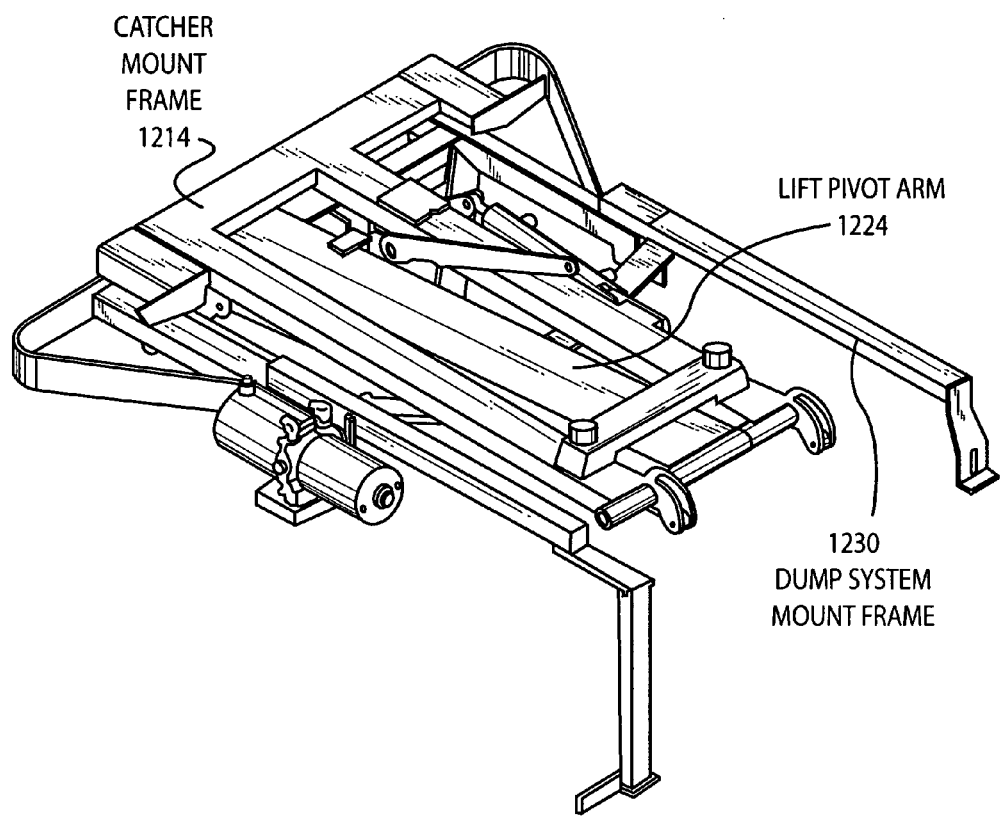
FIG. 12 is an oblique view of the frames and lift pivot arm of the embodiment of FIG. 1B interfolded in a lowered position.

FIG. 12 is an oblique view of the frames and lift pivot arm of the embodiment of FIG. 1 interfolded together in a lowered position. Lift pivot arm 1224 is lowered to a narrowly angled position with respect to dump system mount frame 1230 so that lift pivot arm 1224 is at least partially interfolded into dump system mount frame 1230. Lift pivot arm 1224 is also at least partially interfolded into catcher mount frame 1214. Thus, in the lowered position, catcher mount frame 1214, lift pivot arm 1224, and dump system mount frame 1230 are interfolded together so that their combined height is less that the sum of their individual heights.

Figure 13:
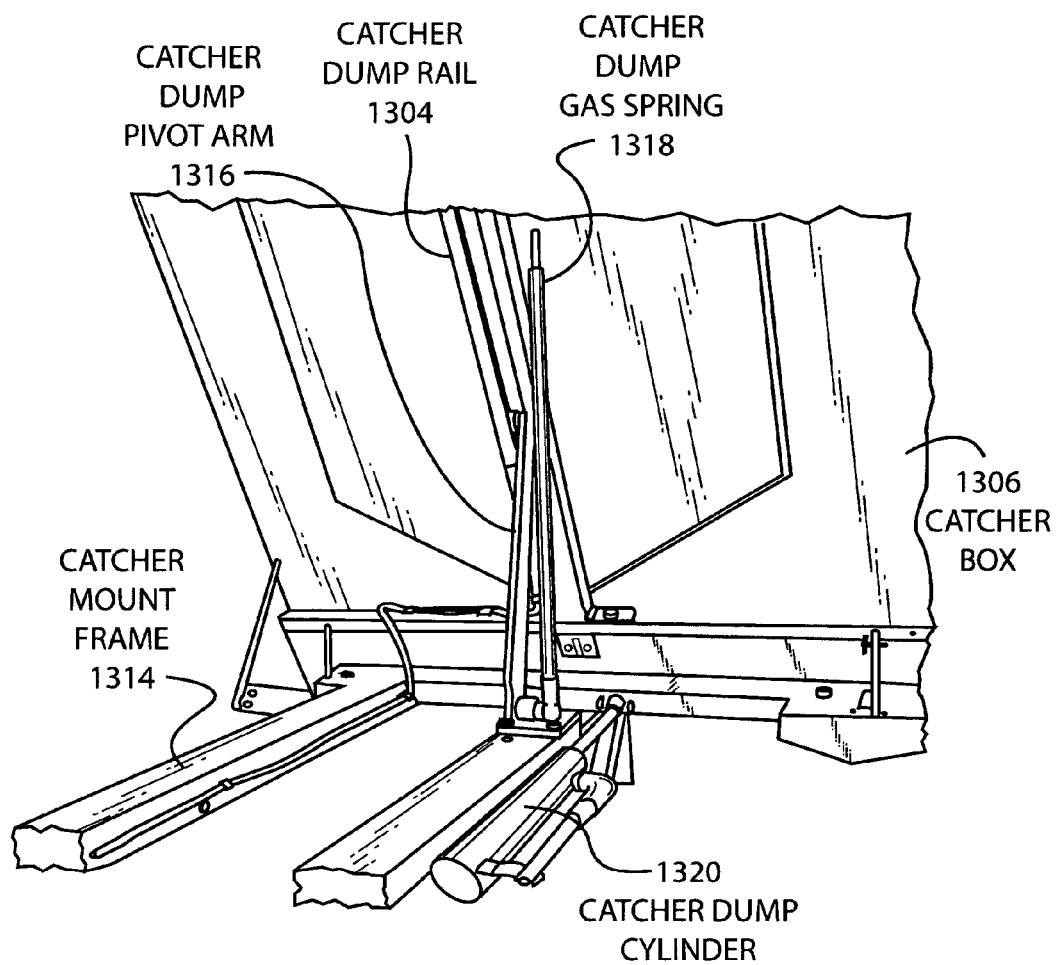
FIG. 13 illustrates dumping mechanisms of the embodiment of FIG. 1B.

FIG. 13 illustrates a catcher box and catcher mount frame of the embodiment of FIG. 1. Catcher box 1306 is attached to catcher mount frame 1314 so that catcher box 1306 may tilt to dump the contents of catcher box 1306. A catcher dump rail 1304 is attached to the underside of catcher box 1306. An upper end of catcher dump pivot arm 1316 has a roller that fits into catcher dump rail. Catcher dump cylinder is connected at one end to catcher dump mount frame 1314. The opposite end of cylinder 1320, i.e. the shaft, is connected to a lever arm that is connected to catcher dump pivot arm.

Figure 14:
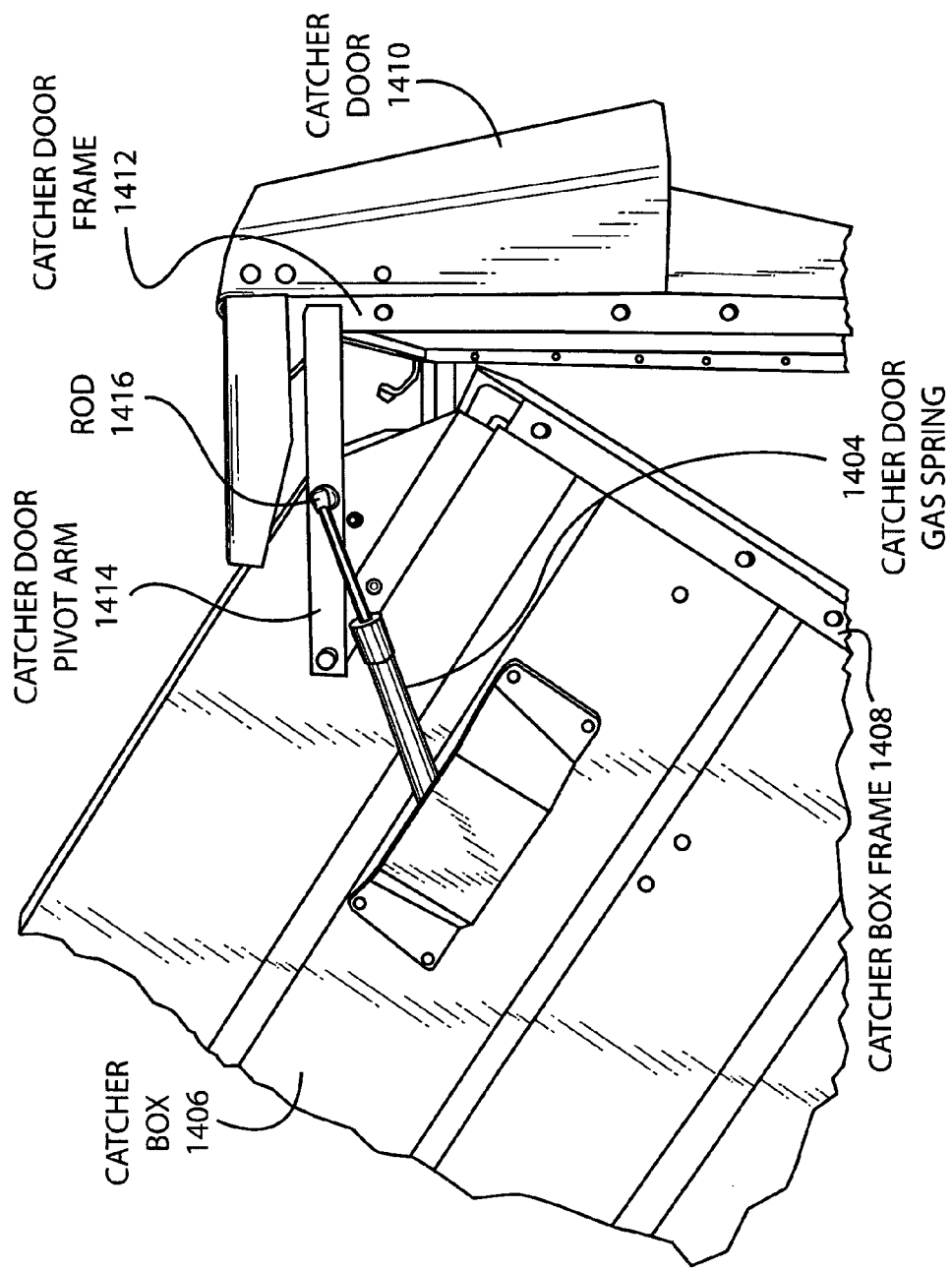
FIG. 14 illustrates external catcher door mechanisms of the embodiment of FIG. 1B.

FIG. 14 illustrates external catcher door mechanisms of the embodiment of FIG. 1. Catcher door 1410 is attached to one end of catcher door pivot arm 1414. The opposite end of catcher door pivot arm 1414 is attached to catcher box 1406 so that when catcher box 1406 tilts to dump, catcher door pivot arm 1414 pivots and raises catcher door 1410 so that it is open during dumping. Catcher dump gas spring 1404 ensures that the raising and lowering of catcher door 1410 is smooth and un-abrupt. Catcher door frame 1412 is attached to catcher door 1410 to provide additional strength and to prevent catcher door 1410 from warping so that it opens and closes well. Catcher box frame 1408 attaches to catcher box 1406 around the perimeter of open section at the rear of catcher box 1406. Catcher box frame 1408 provides additional strength and prevents catcher box 1406 from warping around the open section at the rear of catcher box 1406.

Figure 15:
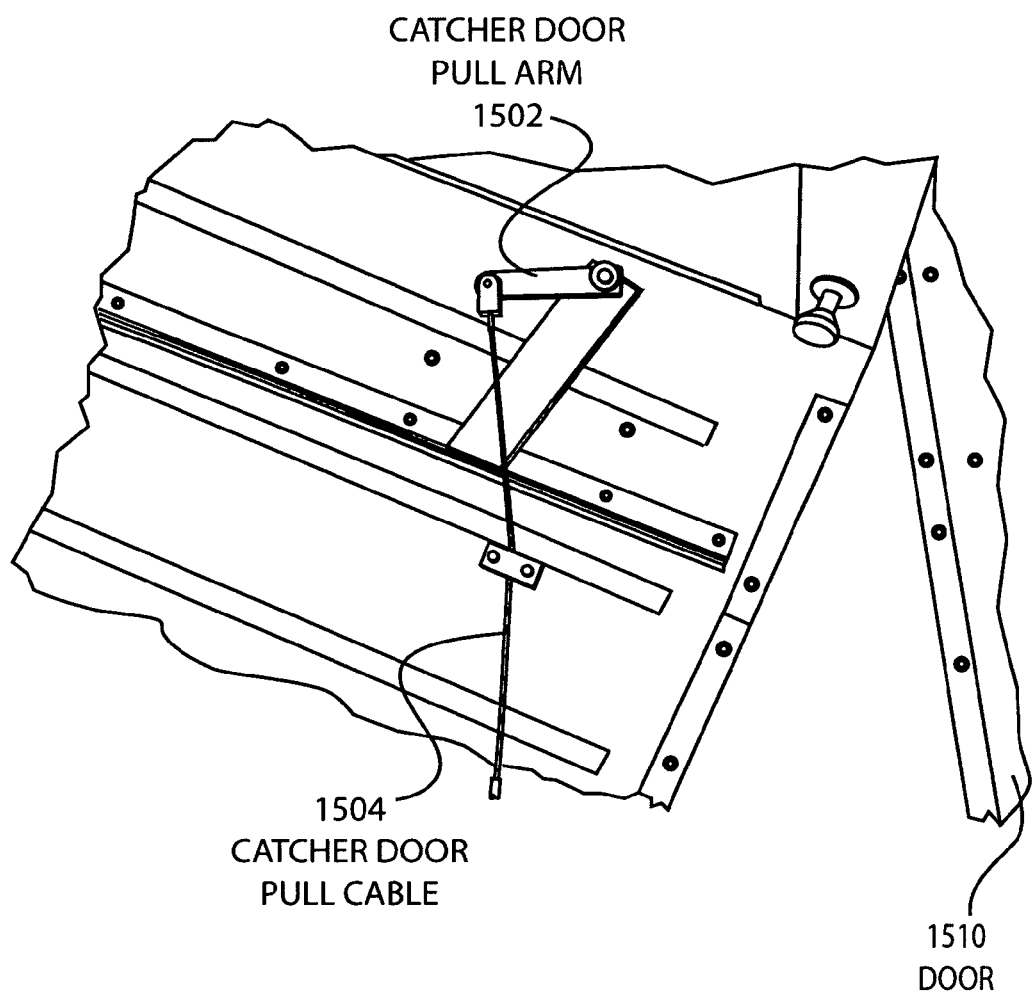
FIG. 15 illustrates internal catcher door mechanisms of the embodiment of FIG. 1B.

FIG. 15 illustrates internal catcher door mechanisms of the embodiment of FIG. 1. Catcher door actuator arm 1502 is attached to one end of rod 1416 (FIG. 14) which connects to catcher door pivot arm 1414 as shown in FIG. 14. The opposite end of catcher door actuator arm 1502 is attached to catcher door actuator cable 1504. When catcher box 1506 is tilted for dumping, catcher door actuator cable 1504 is pulled which cause catcher door actuator arm 1502 to pivot and raise catcher door 1510.

Figure 16:
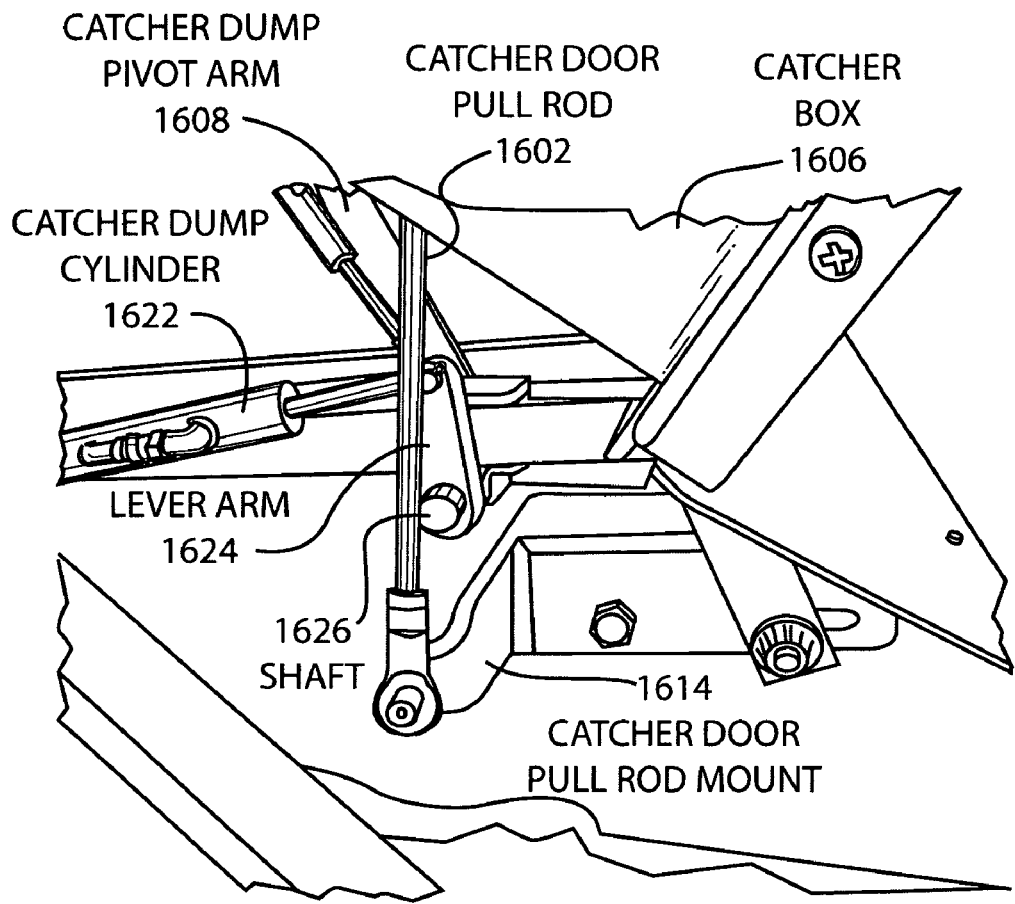
FIG. 16 illustrates other external catcher door mechanisms of the embodiment of FIG. 1B.

FIG. 16 illustrates other external catcher door mechanisms of an embodiment of a high-clearance dump system. Catcher dump cylinder 1622 may be elongated or contracted via hydraulic pressure. Elongation of catcher dump cylinder 1622, which is connected at one end to lever arm 1624, causes lever arm 1624 to pivot. Lever arm 1624 is connected to one end of shaft 1626. The other end of shaft 1626 is connected to catcher dump pivot arm 1608. When lever arm 1624 pivots, catcher dump pivot arm 1608 pivots and tilts catcher box 1606 for dumping. Catcher door cable rod is connected to catcher mount frame 1614. When catcher box 1606 tilts for dumping, catcher door cable rod 1602 pulls on catcher door actuator cable 1504 as shown in FIG. 15.

FIG. 18 illustrates a lift control system of the embodiment of FIG. 1. A hydraulic valve box 1838 is securely attached to dump system mount frame 1830. In the embodiment of FIG. 18, hydraulic power unit 1812 is also securely attached to an outer edge of dump system mount frame 1830 near hydraulic valve box 1838. Hydraulic hoses 1816 and 1818 are connected at one end to hydraulic power unit 1812 and are connect at the opposite end to hydraulic valve box 1838. Hydraulic valve box 1838 acts as a switching valve that connects hydraulic pressure either to hydraulic hoses 1836 and 1842 that connect to the lift cylinder 1822, or alternatively connects hydraulic pressure to hydraulic hoses 1834 and 1844 that are connected at the other end to the dump cylinder.

A lift pivot arm spring 1840 is positioned over lift pivot shaft 1848. Lift pivot arm spring 1840 is a coiled torsion spring. One leg of lift pivot arm spring 1824 presses against a portion of lift pivot arm 1824 and the other leg of lift pivot arm spring 1840 presses against dump system mount frame 1830 so that lift pivot arm spring 1840 provides a force to aid in raising lift pivot arm 1824. The force applied by lift pivot arm spring 1840 reduces the force required from lift cylinder 1822 to raise lift pivot arm 1824.

Hence, the various elements of the high-clearance dump system with independent tilt provide numerous advantages.

The lift control rods with spherical rod ends provide high clearance by raising the back end of the catcher higher that the front end. The raised back end of the catcher causes grass clippings and other contents of the catch to slide toward the front end of the catcher which reduces the likelihood of unintended spillage during lifting. The catcher mount frame extends away from the mower which enables dumping to occur in a position less likely to be near a vehicle side or wall. The hydraulic system for lifting and dumping allows the lifting and dumping operations to be controlled so that the catcher may be lifted without dumping, dumped without lifting, and lifted and dumped in any position which provides flexible control to accommodate a variety of circumstances. The lift pivot arm interfolds compactly into the catcher mount frame and the dump mount frame which provides a low-profile lifting and tilting dump system thus providing superior stability and handling of a riding mower equipped with the high-clearance dump system of the invention.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An interfolding high-clearance dump system comprising:
   a dump system mount assembly adapted to attach to a chassis of a riding mower, said dump system mount assembly comprising:
      a dump system mount frame that is U-shaped having a left-hand member and a back end and a right-hand member, said left-hand member and said right-hand member spaced apart;
      a cross-support that connects to said right-hand member and said left-hand member of said dump system mount frame, said cross-support having a center section that is disposed lower than said left-hand member and said right-hand member of said dump mount system;
      a lift cylinder that pivotally connects at a front end to said cross-support; and
      a left-hand pivot mount and a right-hand pivot mount that are spaced apart and fixedly connected to said back end of said dump system mount frame, said right-hand pivot mount having a bearing sleeve to support an axle and a ball joint to support a spherical rod end, said left-hand pivot mount having a bearing sleeve to support an axle and a ball joint to support a spherical rod end;
   a folding lift assembly that pivotally connects to said dump system mount assembly comprising:
      a lift pivot arm that pivotally connects at a back lower end to said left-hand pivot mount and said right-hand pivot mount of said dump system mount assembly, said lift pivot arm having a center lift pivot mount at a lower end of said lift pivot arm, said center lift pivot mount pivotally connected to said back end of said lift cylinder so that contraction of said lift cylinder exerts a pulling force on said center lift pivot mount which acts as a lever arm that causes said lift pivot arm to pivot and raise;
      a left-hand lift control rod that pivotally connects at a lower end to said left-hand pivot mount, said left-hand lift control rod being shorter in length than said lift pivot arm; and
      a right-hand lift control rod that pivotally connects at a lower end to said right-hand pivot mount, said right-hand lift control rod being shorter in length than said lift pivot arm, said lift pivot and said lift control rods folding so that in a lowered folded position, said lift pivot arm and said lift control rods are at least partially interfolded between said left-hand member and said right-hand member of said dump system mount frame to provide a low-profile dump system;
   a tilting catcher mount assembly that pivotally connects to said folding lift assembly comprising:
      a catcher mount frame that has: a left-hand member; a back end; and a right-hand member, said left-hand member and said right-hand member spaced apart, said left-hand member having a sleeve bearing at a front end of said left-hand member, said right-hand member having a sleeve bearing at a front end of said right-hand member, said catcher mount frame in the raise position extends back away from said lift pivot arm and said dump system mount frame so that said dump system can be dumped at a location substantially behind said riding mower;
      a catcher mount axle that is inserted into said sleeve bearings of said left-hand member and said right-hand member of said catcher mount frame, said catcher mount axle also inserted into a sleeve bearing at said upper front end of said lift pivot arm so that said catcher mount frame is pivotally connected to said lift pivot arm so that in a lowered folded position said lift pivot arm is partially interfolded between said left-hand member and said right-hand member of said catcher mount frame to provide a low-profile dump system;
      a cross-support that is fixedly attached to said left-hand member and said right-hand member of said catcher mount frame at a front end of said catcher mount frame;
      a left-hand bent lever arm that is fixedly connected to said sleeve bearing of said left-hand member of said catcher mount frame;
      a right-hand bent lever arm that is fixedly connected to said sleeve bearing of said left-hand member of said catcher mount frame, said right-hand bent lever arm forming a ball joint with said right-hand lift control rod and said left-hand bent lever arm forming a ball joint with said left-hand lift control rod so that when said lift pivot arm is raised, said left-hand control rod and said right-hand control rod exert a force on said left-hand bent lever arm and said right-hand bent lever arm that causes said catcher mount frame to be disposed at an obtuse angle with respect to said lift pivot arm so that said back end of said catcher mount frame is higher than said front end of said catcher mount frame to provide high clearance for dumping;
   a dumping catcher assembly that pivotally connects to said back end of said tilting catcher mount assembly comprising:

a catcher box that pivotally connects to said back end of said titling catcher mount assembly, said catcher box having a catcher door that opens when said catcher box is dumped;

a dump cylinder that has a front end that pivotally attaches to said catcher mount frame, said dump cylinder having a back end that connects to a lever arm that connects to a shaft, said shaft connecting to a catcher dump pivot arm so that when said catcher dump cylinder is extended a force is exerted which pivots said catcher dump pivot arm which raises a front end of said catcher box higher than said back end of said catcher box so that said tilting catcher mount assembly is at an obtuse angle with respect to said lift pivot arm providing high clearance at said back end of said catcher mount frame, said catcher door opening and dumping when said catcher mount frame is raised and disposed at an obtuse angle with respect to said lift pivot arm; and a power system that controls and switches power between said lift cylinder and said dump cylinder comprising:

a power unit that is electrically connected to a power system of said riding mower;

a switch box having an input that connects to and received power from said power unit, said switch box having a first output that connects to said lift cylinder, said switch box having a second output that connects to said dump cylinder, said switch box switches power from said input between said first output and said second output;

a lift switch that causes said switch box to connect power from said input to said lift cylinder; and a dump switch that causes said switch box to connect power from said input to said dump cylinder.

2. The high clearance dump system of claim 1 wherein said power system further comprises auxiliary power inputs that allow said dump system to operate by receiving power from a power source other than the riding mower power system.

3. The high clearance dump system of claim 1 wherein said upper end and said lower end of said left-hand lift control rod comprise high strength spherical rod ends and wherein said upper end and said lower end of said right-hand lift control rod comprise high strength spherical rod ends.

4. The high-clearance dump system of claim 1 wherein said power system is a hydraulic power system and said switch box, lift cylinder, and dump cylinder are hydraulically controlled.

5. The high-clearance dump system of claim 1 wherein said power system is an electro-mechanical power system and said switch box, lift cylinder, and dump cylinder are electro-mechanically controlled.

6. The high clearance dump system of claim 1 wherein said obtuse angle between said lift pivot arm and said catcher mount frame is an obtuse angle in the range of 95 to 105 degrees.

7. A low-profile interfolding frame system for a high-clearance dump system comprising:

a dump system mount assembly adapted to attach to a chassis of a riding mower, said dump system mount assembly comprising:

a dump system mount frame; and a lift cylinder that pivotally connects at a front end to said dump system mount frame;

an interfolding lift assembly that pivotally connects to said dump system mount assembly comprising:

a lift pivot arm that pivotally connects to said dump system mount assembly, lift pivot arm pivotally connected to a back end of said lift cylinder so that contraction of said lift cylinder causes said lift pivot arm to pivot and raise;

at least one lift control rod that pivotally connects at a lower end to said dump system mount frame, said lift control rod being shorter in length than said lift pivot arm said lift pivot arm and said lift control rod interfolding with said dump system mount frame to provide a low-profile dump system;

a tilting catcher mount assembly that pivotally connects to said folding lift assembly comprising:

a catcher mount frame, said catcher mount frame in a raised position extending back and away from said lift pivot arm and said dump system mount frame so that said dump system can be dumped at a location substantially behind said riding mower, said catcher mount frame being pivotally connected to said lift pivot arm so that in a folded lowered position said lift pivot arm is partially interfolded with said catcher mount frame to provide a low-profile dump system;

at least one bent lever arm that is fixedly connected to said catcher mount frame, said bent lever arm forming a ball joint with said lift control rod so that when said lift pivot arm is raised, said control rod exerts a force on said bent lever arm that causes said catcher mount frame to be disposed at an obtuse angle with respect to said lift pivot arm so that said back end of said catcher mount frame is higher than said front end of said catcher mount frame to provide high clearance.

8. A high-clearance dump system comprising:

a dump system mount assembly adapted to attach to a chassis of a riding mower, said dump system mount assembly comprising:

a dump system mount frame; and a lift cylinder that pivotally connects at a front end to said dump system mount frame;

a lift assembly that pivotally connects to said dump system mount assembly comprising:

a lift pivot arm that pivotally connects at a back lower end to said dump system mount assembly, said lift pivot arm pivotally connecting to a back end of said lift cylinder so that contraction of said lift cylinder exerts a pulling force that causes said lift pivot arm to pivot and raise; and at least one control rod that pivotally connects at a lower end to said dump system mount frame, said left-hand lift control rod being shorter in length than said lift pivot arm;

a tilting catcher mount assembly that pivotally connects to said folding lift assembly comprising:

a catcher mount frame that in the raised position extends back away from said lift pivot arm and said dump system mount frame so that said dump system can be dumped at a location substantially behind said riding mower, said catcher mount frame pivotally connecting to said lift pivot arm;

at least one bent lever arm that is fixedly connected to said catcher mount frame, said bent lever arm pivotally connect to said lift control rod so that when said lift pivot arm is raised, said control rod exerts a force on said bent lever arm that causes said catcher mount frame to be disposed at an obtuse angle with respect to said lift pivot arm so that said back end of said catcher mount frame is higher than said front end of said catcher mount frame to provide high clearance for dumping;

a dumping catcher assembly that pivotally connects to said back end of said tilting catcher mount assembly comprising:

a catcher box that pivotally connects to said back end of said titling catcher mount assembly; and a dump cylinder that pivotally connects to said catcher mount frame and to a lever arm that connects to a shaft, said shaft connecting to a catcher dump pivot arm so that when said catcher dump cylinder is extended a force is exerted which raises a front end of said catcher box higher than said back end of said catcher box; and a power system that control and switches power between said lift cylinder and said dump cylinder.

* * * * *